United States Patent
Izumikawa et al.

(10) Patent No.: US 9,715,015 B2
(45) Date of Patent: Jul. 25, 2017

(54) PERIPHERY-MONITORING DEVICE FOR WORKING MACHINES

(71) Applicants: SUMITOMO(S.H.I.) CONSTRUCTION MACHINERY CO., LTD., Tokyo (JP); SUMITOMO HEAVY INDUSTRIES, LTD., Tokyo (JP)

(72) Inventors: Takeya Izumikawa, Chiba (JP); Yoshihisa Kiyota, Kanagawa (JP); Susumu Aizawa, Kanagawa (JP)

(73) Assignees: SUMITOMO(S.H.I.) CONSTRUCTION MACHINERY CO., LTD., Tokyo (JP); SUMITOMO HEAVY INDUSTRIES, LTD., Tokyo (JP)

( * ) Notice: Subject to any disclaimer, the term of this patent is extended or adjusted under 35 U.S.C. 154(b) by 229 days.

(21) Appl. No.: 14/465,950

(22) Filed: Aug. 22, 2014

(65) Prior Publication Data
US 2014/0362220 A1   Dec. 11, 2014

Related U.S. Application Data

(63) Continuation of application No. PCT/JP2013/052937, filed on Feb. 7, 2013.

(30) Foreign Application Priority Data

Mar. 29, 2012 (JP) ................................ 2012-078340

(51) Int. Cl.
*H04N 7/18* (2006.01)
*G01S 17/42* (2006.01)
(Continued)

(52) U.S. Cl.
CPC ............... *G01S 17/42* (2013.01); *E02F 9/26* (2013.01); *E02F 9/261* (2013.01); *G01S 7/4808* (2013.01);
(Continued)

(58) Field of Classification Search
CPC .......... E02F 9/26; E02F 9/261; G01S 17/023; G01S 17/026; G01S 17/42; G01S 17/87;
(Continued)

(56) References Cited

U.S. PATENT DOCUMENTS

| 2004/0101162 A1* | 5/2004 | Higaki | .................. G01C 11/00 382/103 |
| 2004/0105579 A1* | 6/2004 | Ishii | ......................... B60R 1/00 382/154 |

(Continued)

FOREIGN PATENT DOCUMENTS

| EP | 1115250 A1 | 7/2001 |
| JP | H05-028243 | 2/1993 |

(Continued)

OTHER PUBLICATIONS

International Search Report mailed on Mar. 5, 2013.

*Primary Examiner* — Mohammed Rahaman
(74) *Attorney, Agent, or Firm* — IPUSA, PLLC

(57) ABSTRACT

A periphery-monitoring device for working machines creates an output distance image based on an input distance image taken by a distance image sensor attached to a working machine. The periphery-monitoring device for working machines includes a computer programmed to execute a process including obtaining coordinates on an input distance image plane on which the input distance image is positioned, obtaining coordinates on an output distance image plane on which the output distance image is
(Continued)

positioned and associating the input distance image and the output distance image with each other.

7 Claims, 19 Drawing Sheets

(51) Int. Cl.
| | | |
|---|---|---|
| *G01S 17/89* | (2006.01) | |
| *G01S 17/87* | (2006.01) | |
| *G01S 7/497* | (2006.01) | |
| *E02F 9/26* | (2006.01) | |
| *G01S 17/02* | (2006.01) | |
| *G06K 9/00* | (2006.01) | |
| *G01S 17/93* | (2006.01) | |
| *G01S 7/48* | (2006.01) | |
| *G01S 7/51* | (2006.01) | |

(52) U.S. Cl.
CPC ........... *G01S 7/497* (2013.01); *G01S 7/51* (2013.01); *G01S 17/023* (2013.01); *G01S 17/026* (2013.01); *G01S 17/87* (2013.01); *G01S 17/89* (2013.01); *G01S 17/936* (2013.01); *G06K 9/00697* (2013.01); *G06K 9/00791* (2013.01); *H04N 7/18* (2013.01)

(58) Field of Classification Search
CPC ...... G01S 17/89; G01S 17/936; G01S 7/4808; G01S 7/497; G01S 7/51; G06K 9/00697; G06K 9/00791; H04N 7/18
See application file for complete search history.

(56) References Cited

U.S. PATENT DOCUMENTS

| | | | |
|---|---|---|---|
| 2006/0029271 A1 | 2/2006 | Miyoshi et al. | |
| 2007/0120656 A1* | 5/2007 | Nakanishi | B60R 1/00 340/435 |
| 2008/0246843 A1 | 10/2008 | Nagata et al. | |
| 2008/0309784 A1* | 12/2008 | Asari | B60R 1/00 348/222.1 |
| 2010/0220189 A1* | 9/2010 | Yanagi | B60R 1/00 348/148 |
| 2011/0115922 A1* | 5/2011 | Shimizu | G06T 7/0018 348/188 |
| 2011/0150329 A1* | 6/2011 | Lepine | G06T 3/4038 382/165 |
| 2013/0033494 A1 | 2/2013 | Kiyota | |

FOREIGN PATENT DOCUMENTS

| | | |
|---|---|---|
| JP | 2000-230809 | 8/2000 |
| JP | 2000-357007 | 12/2000 |
| JP | 2003-016477 | 1/2003 |
| JP | 2006-050263 | 2/2006 |
| JP | 2008-163719 | 7/2008 |
| JP | 2009-049943 | 3/2009 |
| JP | 2011-221865 | 11/2011 |
| WO | 2005/107261 | 11/2005 |

* cited by examiner

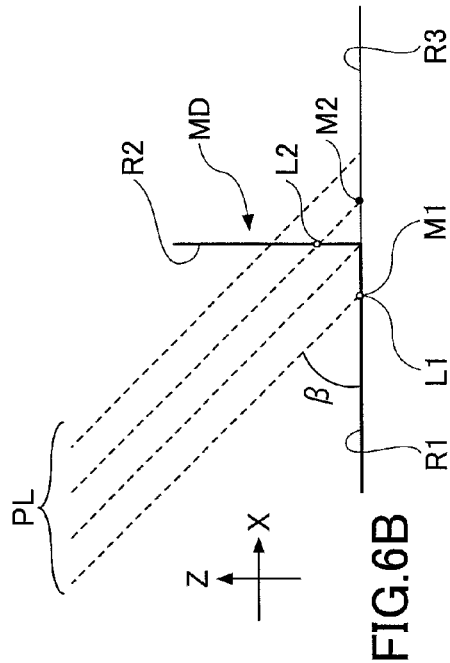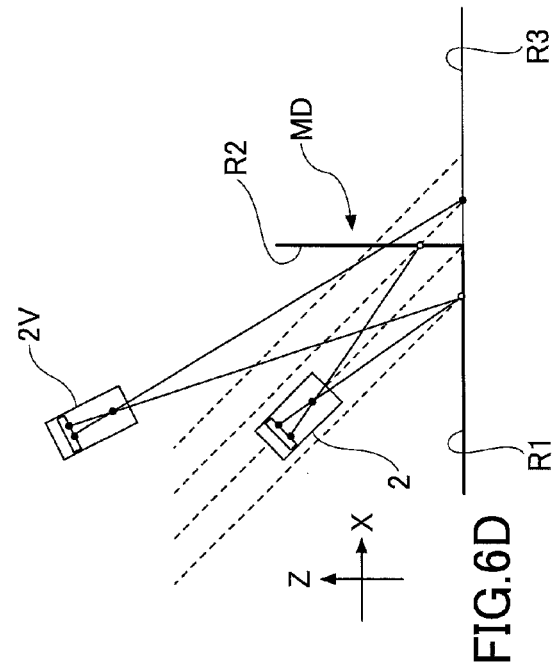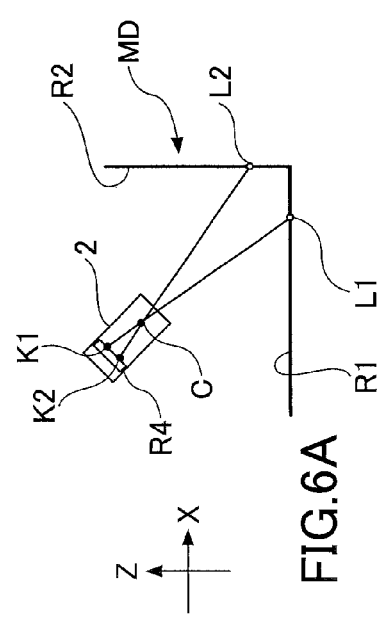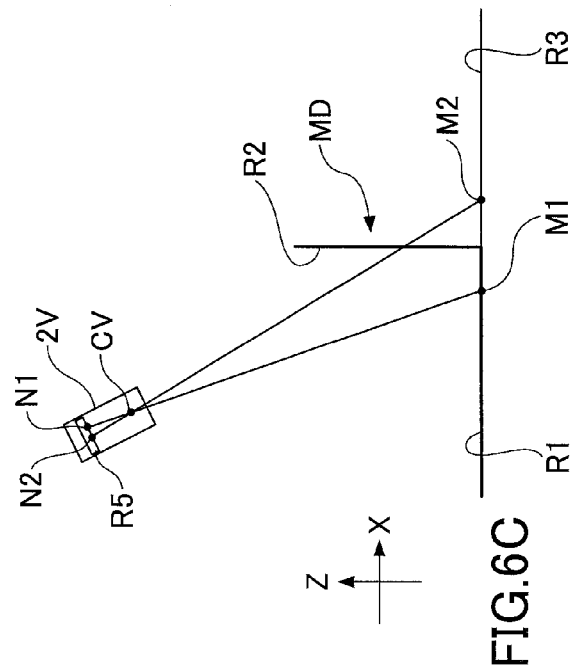
FIG.6A
FIG.6B
FIG.6C
FIG.6D

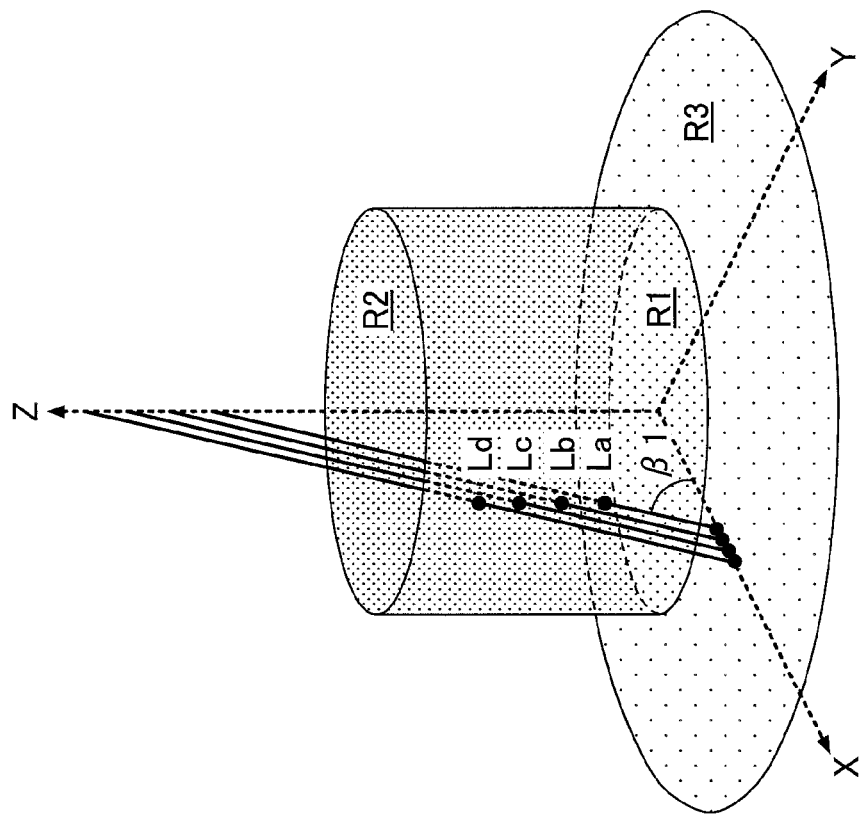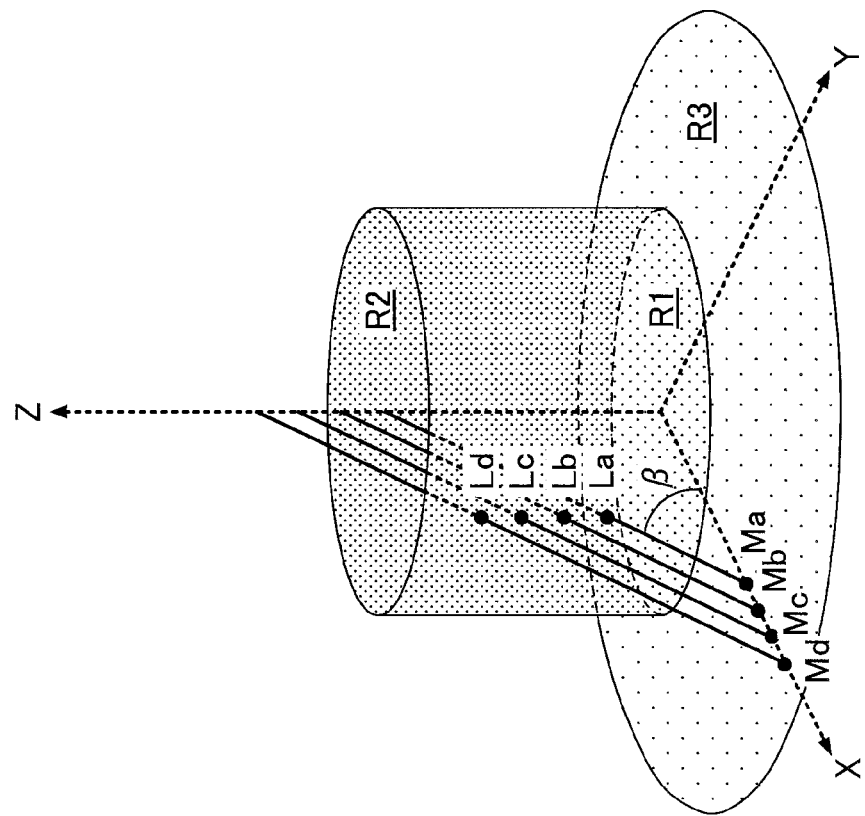

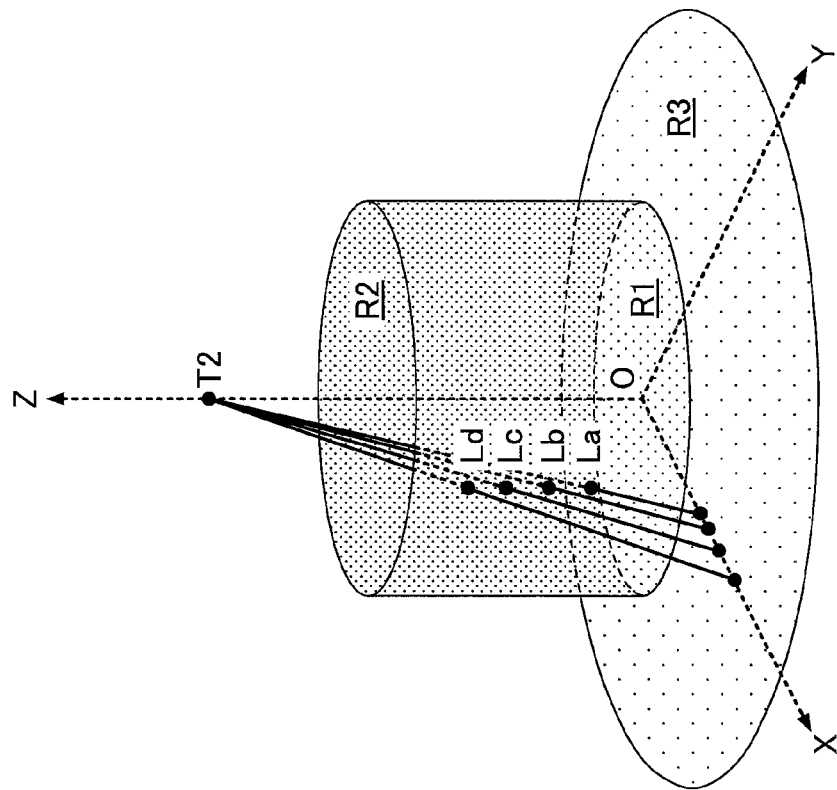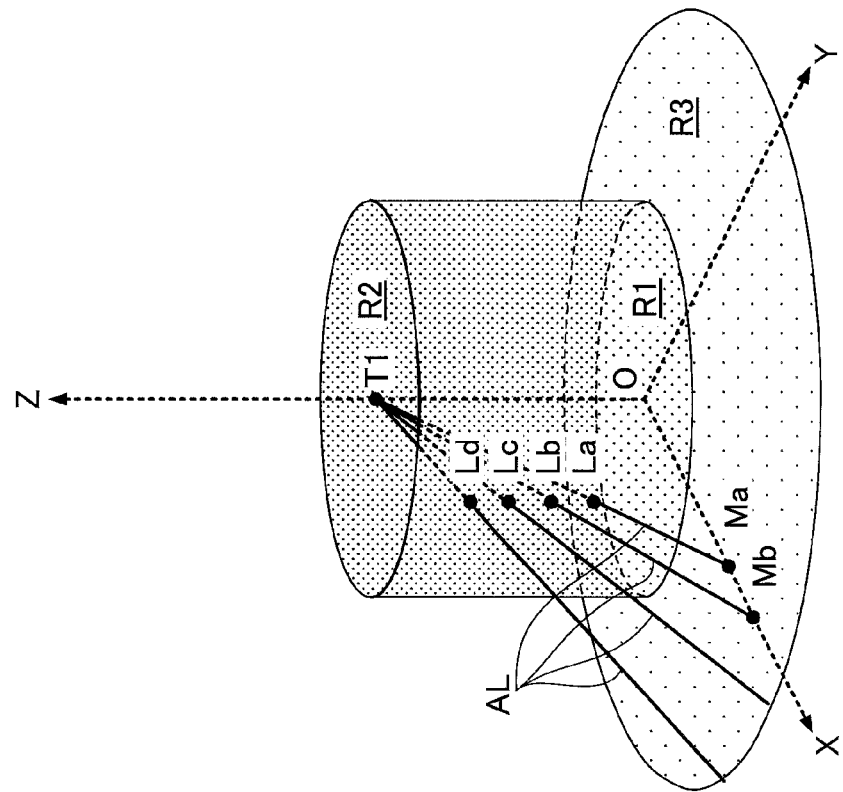

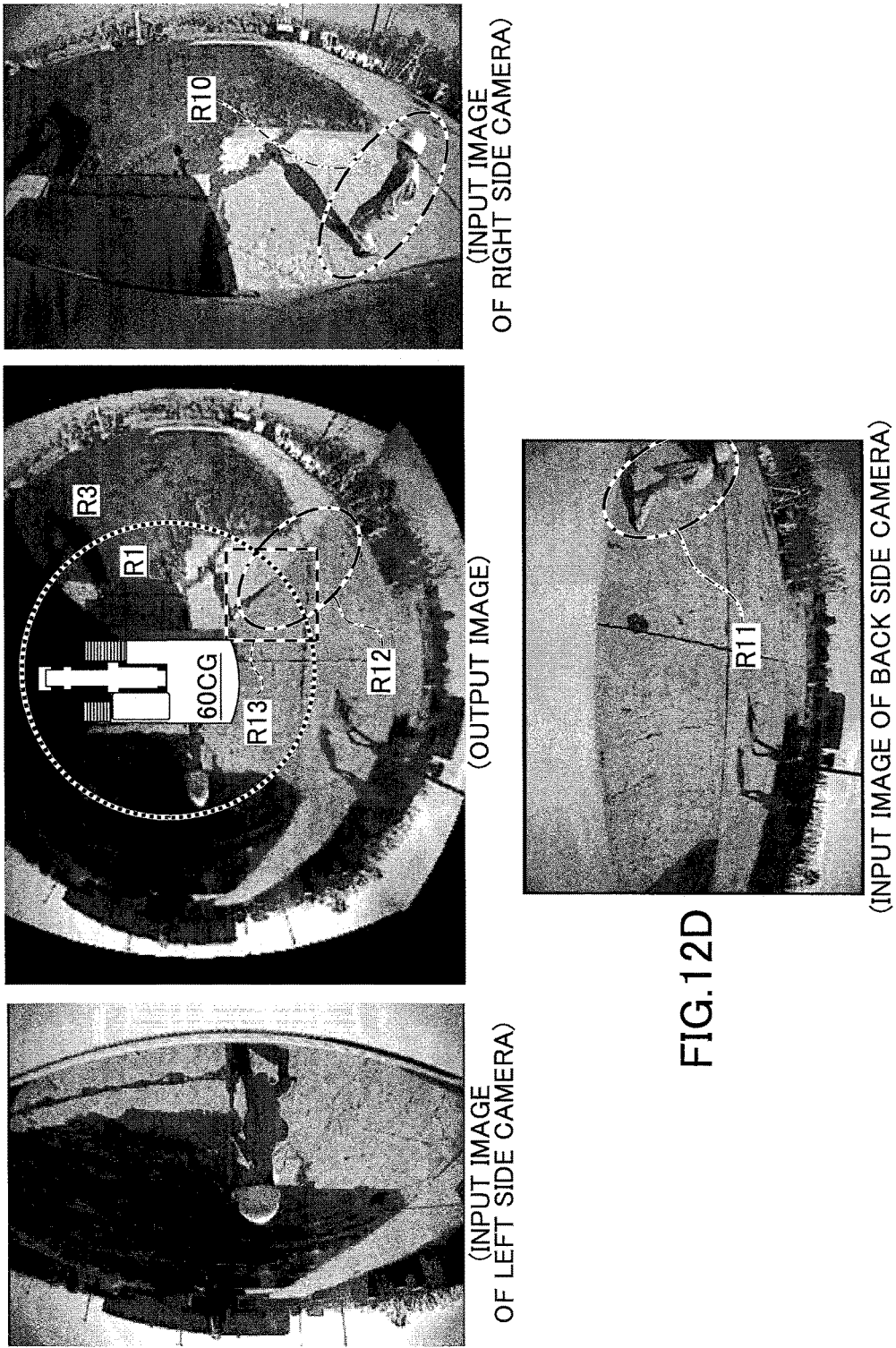

(INPUT DISTANCE IMAGE OF RIGHT SIDE DISTANCE IMAGE SENSOR)

(OUTPUT DISTANCE IMAGE)

(INPUT DISTANCE IMAGE OF LEFT SIDE DISTANCE IMAGE SENSOR)

(INPUT DISTANCE IMAGE OF BACK SIDE DISTANCE IMAGE SENSOR)

PERIPHERY-MONITORING DEVICE FOR WORKING MACHINES

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2013/052937 filed on Feb. 7, 2013, designating the U.S., which claims priority based on Japanese Patent Application No. 2012-078340. The entire contents of each of the foregoing applications are incorporated herein by reference.

BACKGROUND

Technical Field

The present invention relates to a periphery-monitoring device for working machines.

Description of Related Art

Conventionally, there is known a periphery-monitoring device that monitors a periphery of a shovel while acquiring a distance and a direction of an object, which exists in the periphery of the shovel, using a laser radar attached to an upper-part turning body of the shovel.

The periphery-monitoring device determines that, when a distance and a direction of the object to the shovel do not change for a predetermined time period, the object is a static obstacle. On the other hand, the periphery-monitoring device determines that, when a distance and a direction to the shovel has changed, the object is a moving obstacle. Thereupon, the periphery-monitoring device creates an illustration image of the shovel and the periphery of the shovel viewed from above, and displays an illustration representing an obstacle at a position corresponding to the actual position of the obstacle in the illustration image. Additionally, the periphery-monitoring device displays a static obstacle and a moving obstacle by illustrations of different modes.

As mentioned above, the periphery-monitoring device can convey the situation of the obstacle in the periphery of the shovel to a driver intelligibly.

SUMMARY

There is provided according to an aspect of the invention a periphery-monitoring device for working machines that creates an output distance image based on an input distance image taken by a distance image sensor attached to a working machine. The periphery-monitoring device for working machines includes a computer programmed to execute a process including obtaining coordinates on an input distance image plane on which the input distance image is positioned, obtaining coordinates on an output distance image plane on which the output distance image is positioned and associating the input distance image and the output distance image with each other.

BRIEF DESCRIPTION OF THE DRAWINGS

FIG. 6A is an illustration illustrating a correspondence relationship between coordinates on the input image plane by a camera using a normal projection and coordinates on the space model;

FIG. 6B is an illustration illustrating a correspondence relationship between coordinates on a curved surface area of the space model and coordinates on a processing-target image plane;

FIG. 6C is an illustration illustrating a correspondence relationship between coordinates on a processing-target image plane and coordinates on an output image plane of a virtual camera;

FIG. 6D is an illustration illustrating a mutual positional relationship between the camera, the virtual camera, the flat surface area and curved surface area of the space model, and the processing-target image plane;

FIG. 7A is an illustration of a case where an angle is formed between a group of parallel lines positioned on an XZ-plane and the processing-target image plane;

FIG. 7B is an illustration of a case where a different angle is formed between the group of parallel lines positioned on the XZ-plane and the processing-target image plane;

FIG. 8A is an illustration of a case where all of a group of auxiliary lines positioned on the XZ-plane extend from a start point on the Z-axis toward the processing-target image plane;

FIG. 8B is an illustration of a case where all of the group of auxiliary lines positioned on the XZ-plane extend from a different start point on the Z-axis toward the processing-target image plane;

FIG. 12A is a photographic illustration of an output image;

FIG. 12B is a photographic illustration of an input image taken by a left side camera;

FIG. 12C is a photographic illustration of an input image taken by a right side camera;

FIG. 12D is a photographic illustration of an input image taken by a back side camera;

DETAILED DESCRIPTION

The above-mentioned laser radar irradiates a single beam of laser light onto an object in order to detect a distance and a direction to the object from a reflected laser light. Thus, the laser radar merely detects a distance between an extremely limited portion of the surface of the object and the laser radar itself, and a result of the detection is merely used for roughly determining the position of the illustration representing the object. Accordingly, the output image provided by the periphery-monitoring device is not sufficient for intelligibly conveying the existence of the peripheral object to the driver.

Hereafter, a description will be given, with reference to the drawings, of an embodiment of the present invention.

Figure 1:
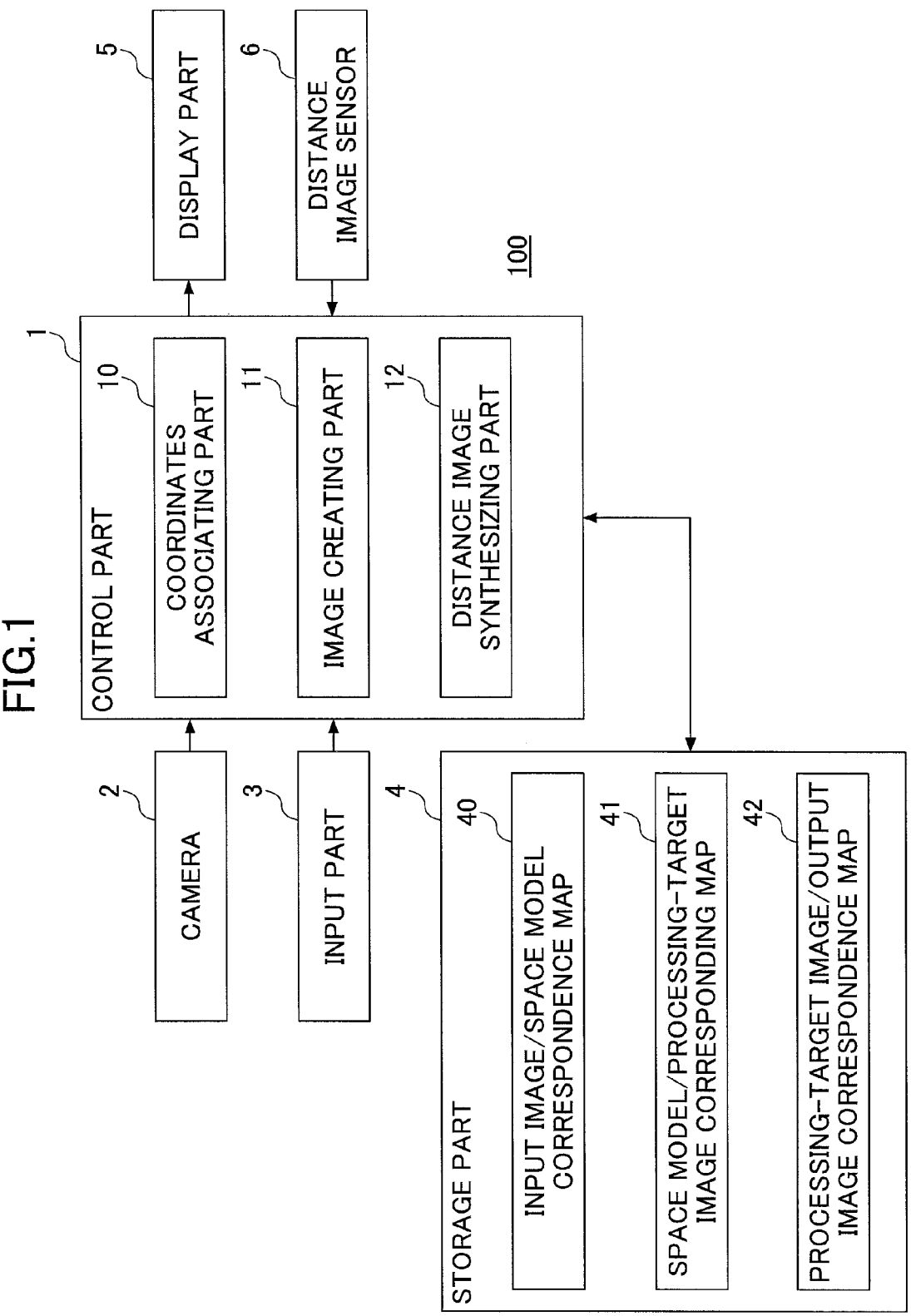
FIG. 1 is a block diagram schematically illustrating a structure of an image-creating device according to an embodiment of the present invention.

FIG. 1 is a block diagram of an image-creating device according to an embodiment of the present invention.

The image-creating device 100 is an example of a periphery-monitoring device for working machines that monitors a periphery of a working machine. The image-creating device 100 includes a control part 1, a camera 2, an input part 3, a storage part 4, a display part 5 and a distance image sensor 6. Specifically, the image-creating device 100 creates an output image based on an input image taken by the camera 2 mounted to the working machine and an input distance image taken by the distance image sensor 6 mentioned later, and presents the output image to an operator.

Figure 2:
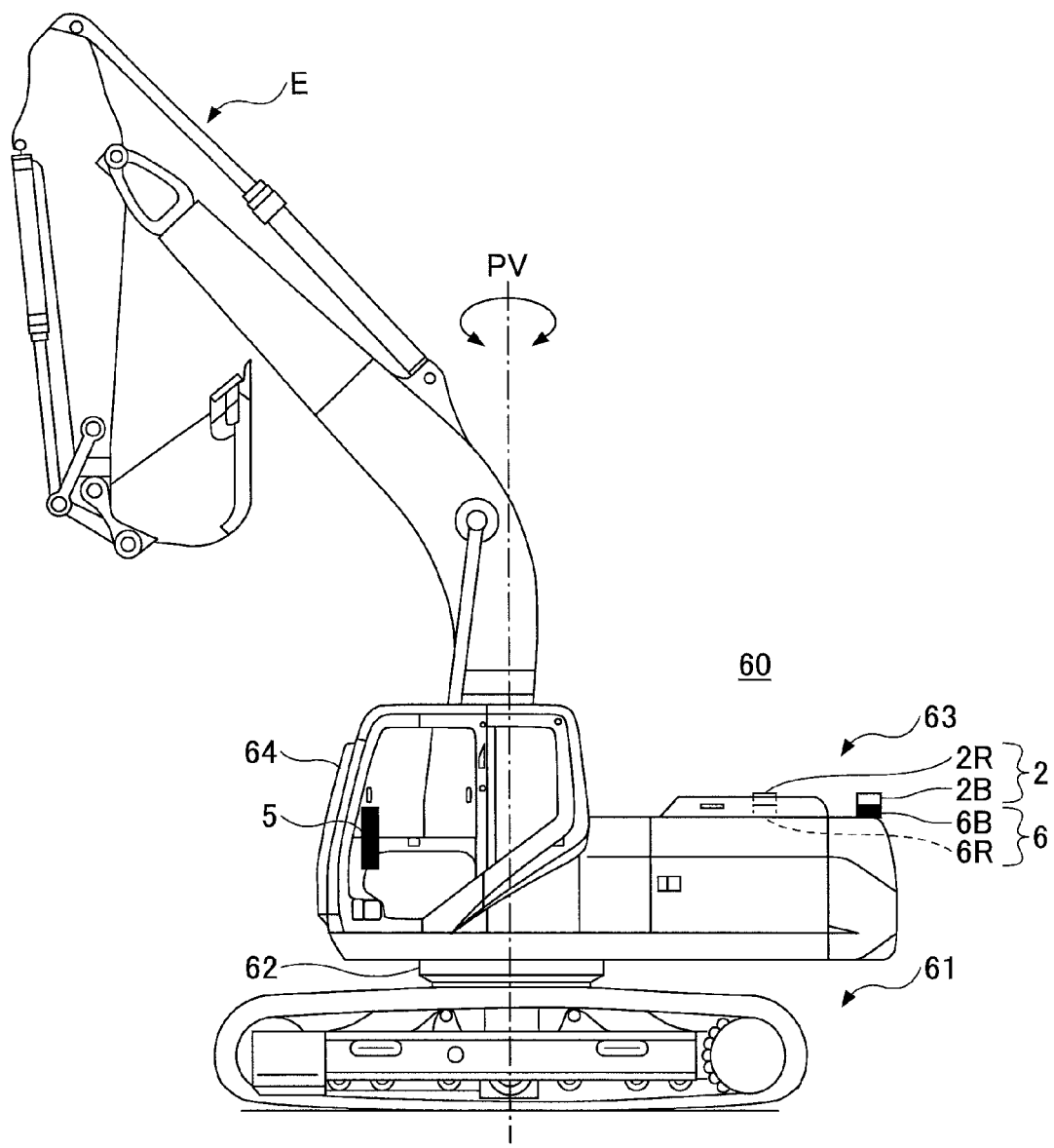
FIG. 2 is a side view of a shovel equipped with the image-creating device.

FIG. 2 is a side view of a shovel 60 as a working machine to which the image-creating device 100 is mounted. The shovel 60 is equipped with an upper-part turning body 63 via a turning mechanism 62 so that the upper-part turning body 63 turns about a turning axis PV.

The shovel 60 is equipped with a cab (driver room) 64 on the front-left side part, an excavation attachment E in a front-center part, and the camera 2 (a right side camera 2R and a back side camera 2B) and the distance image sensor 6 (a right side distance sensor 6R and a back side distance image sensor 6B) on the right side surface and the back side surface thereof. It should be noted that the display part 5 is installed at a position at which the operator in the cab 64 can visually recognize the display easily.

Next, a description is given of each structural element of the image-creating device 100.

The control part 1 is a computer provided with a CPU (Central Processing Unit), a RAM (Random Access Memory), a ROM (Read Only Memory), an NVRAM (Non-Volatile Random Access Memory), etc. In the present embodiment, for example, programs corresponding to each of a coordinates-associating part 10, an image-creating part 11 and a distance image synthesizing part 12 mentioned later are stored in the ROM or the NVRAM so as to have the CPU to execute processes corresponding to each part while using the RAM as a temporary storage area.

The camera 2 is a device for acquiring an input image which projects a periphery of the shovel. In the present embodiment, the camera 2 includes a right side camera 2R and a back side camera 2B mounted on the right side surface and the back side surface of the upper-part turning body 63 so that a picture of an area, which is a blind spot for the operator, can be taken (refer to FIG. 2). Hereinafter, the right side camera 2R and the back side camera 2B may be collectively referred to as a camera 2. The camera 2 is equipped with an image pick-up device, such as a CCD (Charge Coupled Device), a CMOS (Complementary Metal Oxide Semiconductor), etc. In addition, the camera 2 may be attached at positions (for example, a front surface and a left side surface) other than the right side surface and the back side surface of the upper-part turning body 63, and may be equipped with a wide-angle lens or a fish-eye lens so that an image of a wide range can be taken.

The camera 2 acquires an input image according to a control signal from the control part 1, and outputs the acquired input image to the control part 1. In addition, when the camera 2 acquires the input image using a fish-eye lens or a wide-angle lens, the camera 2 outputs a corrected input image to the control part 1 in which an apparent distortion or tilting, which is caused by use of those lenses, is corrected. However, the camera 2 may output the acquired input image without correction. In such a case, the control part 1 corrects an apparent distortion and tilting.

The input part 3 is a device for an operator to enable inputting various kinds of information to the image-creating device 100. The input part 3 includes, for example, a touch panel, a button switch, a pointing device, a keyboard, etc.

The storage part 4 is a device for storing various kinds of information. The storage part 4 includes, for example, a hard disk, an optical disk, a semiconductor memory, etc.

The display part 5 is a device for displaying image information. The display part 5 includes, for example, a liquid crystal display or a projector, which is installed in the cab 64 (refer to FIG. 2) of the shovel 60 so as to display various images output from the control part 1.

The distance image sensor 6 is a device for acquiring a two-dimensional arrangement of distance information regarding an object existing in a periphery of the shovel 60. In the present embodiment, the distance image sensor 6 is attached to the right side surface and the back side surface of the upper-part turning body 63 (refer to FIG. 2) so that a picture of an area, which is a blind spot for the operator in the cabin 64, can be taken. It should be noted that the distance image sensor 6 may be attached to one of the front surface, left side surface and back side surface of the upper-part turning body 63, and may be attached to all surfaces.

The distance image sensor 6 is a sensor for acquiring distance information for each pixel while the camera 2 acquires a brightness value, a hue value, a chroma value, etc. For example, the distance image sensor 6 is configured by an LED for projecting a light and a CCD for receiving a light. Specifically, the distance image sensor 6 uses a TOF (Time Of Flight) method so as to acquire distance information for each pixel by measuring a time period from a time when a near infrared light is irradiated from the LED for projecting light until a time when the near infrared light is reflected by an object and the reflected light is received by the CCD for receiving a light. Thus, hereinafter, the distance information of a two-dimensional arrangement by the image sensor 6 is referred to as an input distance image and an output distance image in contrast to the input image and the output image of the camera 2. It should be noted that the distance image sensor 6 may use other methods such as a pattern projection method or the like. Additionally, the resolution (a number of pixels) of the input distance image and the output distance image of the distance image sensor 6 may be the same as the resolution in the input image and the output image of the camera 2, or may be different. Additionally, one of more pixels in the input image and the output image of the camera 2 may be associated with one or more pixels in the input distance image and the output distance image of the distance image sensor 6 beforehand.

Additionally, similar to the camera 2, the distance image sensor 6 may be attached to positions other than the right side surface and the back side surface of the upper-part turning body 63 (for example, the front surface and the left side surface), and a wide-angle lens or a fish-eye lens may be attached so that a wide range image can be taken.

Similar to the camera 2, the distance image sensor 6 acquires an input distance image in response to a control signal from the control part 1, and outputs the acquired input distance image to the control part 1. It should be noted that, similar to the camera 2, when the input distance image is acquired using a fish-eye lens or a wide-angle lens, a corrected input distance image in which an apparent distortion or tiling generated by the use of a fish-eye lens or a wide-angle lens is corrected, is output to the control part 1. Additionally, the distance image sensor 6 may output the input distance image, in which an apparent distortion or tilting is not corrected, to the control part 1 without change. In such a case, the control part 1 corrects the apparent distortion or tilting.

Moreover, the image-creating device 100 may generate a processing-target image based on an input image, and may display an output image to an operator after creating the output image by applying an image conversion process to the processing-target image so that the output image enables intuitive perception of a positional relationship with a peripheral obstacle and a distance sense.

The image-creating device 100 performs the same process with respect to the input distance image. In such a case, the processing-target image is substituted by a processing-target distance image. The same applies in the following description.

The "processing-target image" is an image created based on an input image. The "processing-target image" is subjected to an image conversion process (for example, a scale conversion, an affine conversion, a distortion conversion, a viewpoint conversion processing, etc.). Specifically, the "processing-target image" is an image suitable for an image conversion process, and is created from a input image by a camera taking a picture of a ground surface from above and contains an image in a horizontal direction due to a wide image angle (for example, a part of the sky). More specifically, the processing-target image is created by re-projecting the projection image projected on a predetermined space model onto a different two-dimensional plane after the input image is projected onto the predetermined space model so that the image in a horizontal direction is not displayed unnaturally (for example, it is not handled as a part of the sky existing on a ground surface). It should be noted that the processing-target image may be used as an output image without being applied with an image conversion process.

The "space model" is a projection target of an input image. Specifically, the "space model" is configured by one or more flat surfaces or curved surfaces containing at least a plane surface or a curved surface other than a processing-target image plane, which is a plane on which the processing-target image is positioned. For example, a flat surface or a curved surface other than a processing-target image plane, which is a flat surface on which the processing-target image is positioned, is a flat surface parallel to the processing-target image plane or a flat surface or a curved surface forming an angle with the processing-target image plane.

It should be noted that the image-creating device 100 may create an output image by applying an image conversion process to a projection image projected onto the space model without creating a processing-target image. Moreover, the projection image may be used as an output image without being subjected to an image conversion process.

Figure 3A:
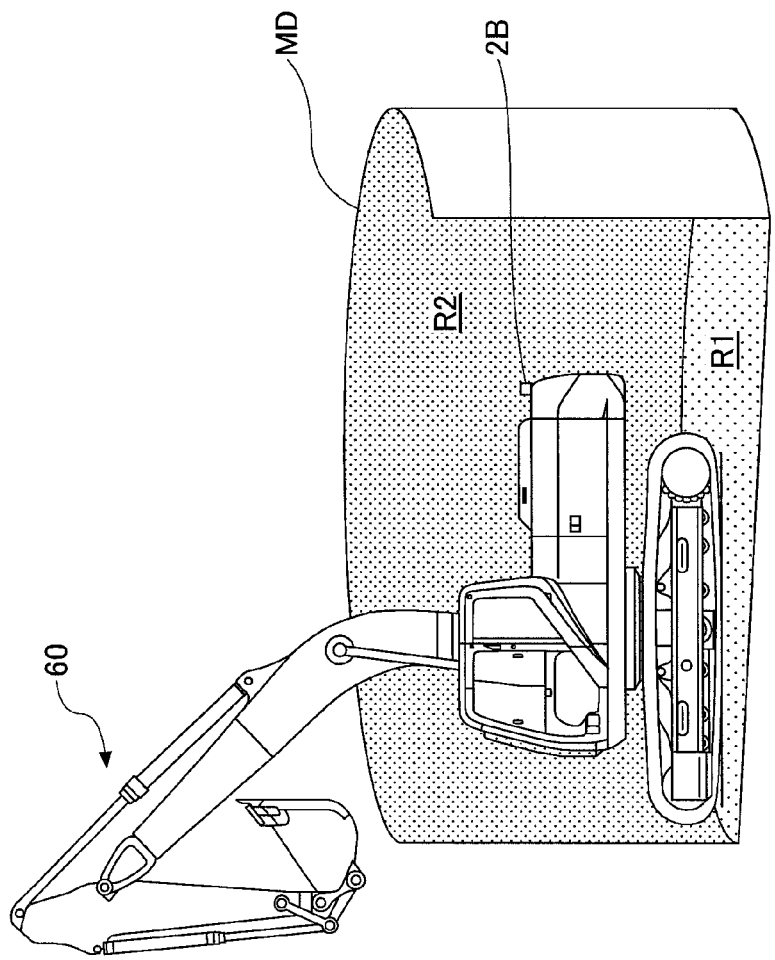
FIG. 3A is a perspective view of a space model to which an input image is projected.
Figure 3B:
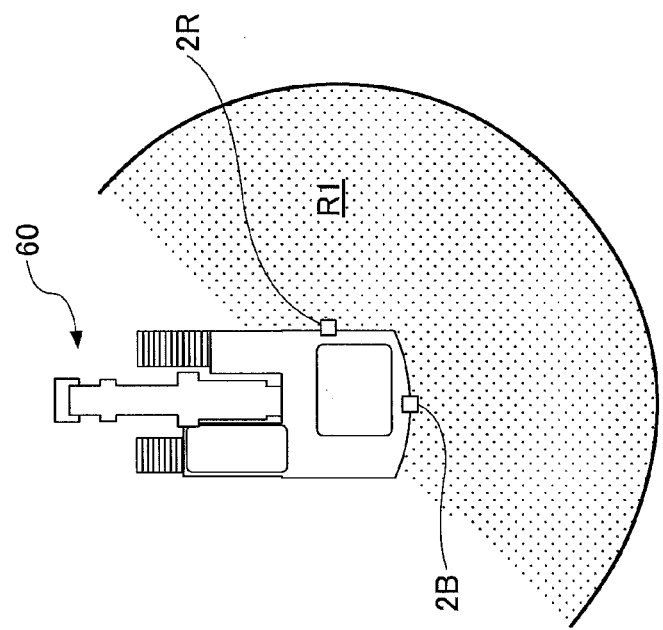
FIG. 3B is a plan view of the space model illustrated in FIG. 3A.

FIGS. 3A and 3B are an illustrations illustrating examples of the space model MD on which an input image is projected. FIG. 3A illustrates a relationship between the shovel 60 viewed from a side of the shovel 60 and the space model MD. FIG. 3B illustrates a relationship between the shovel 60 viewed from above and the space model MD.

As illustrated in FIG. 3A, the space model MD has a half-cylindrical form, and includes a flat surface area R1 of an inner side of the bottom surface thereof and a curved surface area R2 of an inner side of a side surface thereof.

Figure 4:
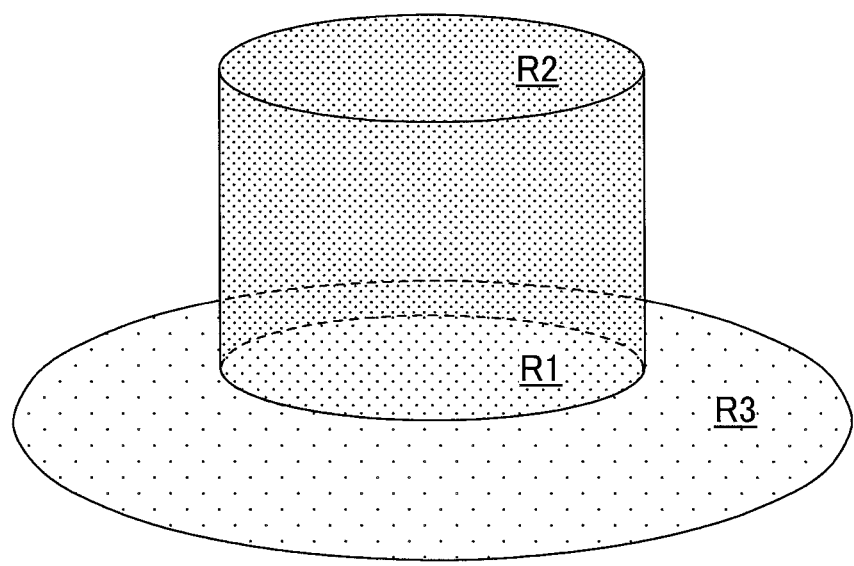
FIG. 4 is a view illustrating a relationship between the space model and an image plane to be processed.

FIG. 4 is a view illustrating an example of a relationship between the space model MD and a processing-target image plane R3. The processing-target image plane R3 is, for example, a plane containing the flat surface area R1 of the space model MD. It should be noted that although the space model MD is illustrated as a cylindrical form, which is different from the half-cylindrical form as illustrated in FIG. 3A, the space model MD may be either of the half-cylindrical form or the cylindrical form. The same applies in figures mentioned below. Additionally, the processing-target image plane R3 may be a circular area, which contains the flat surface area R1 of the space model MD, or may be an annular area, which does not contain the flat surface area R1 of the space model MD.

Next, a description is given of various parts included in the control part 1.

The coordinates-associating part 10 is a part to associate the coordinates on the input image plane on which the input image taken by the camera 2 is positioned, the coordinates on the space model MD, and the coordinates on the processing-target image plane R3 with each other. In the present embodiment, for example, the coordinates on the input image plane, the coordinates on the space model MD and the coordinates on the processing-target image plane R3 are associated with each other based on various parameters with respect to the camera 2, which are set previously or input through the input part 3, and a previously determined positional relationship between the input image plane, the space model MD and the processing-target image plane R3. It should be noted that various parameters with respect to the camera 2 are, for example, an optical center, a focal distance, a CCD size, an optical axis direction vector, a camera horizontal direction vector, a projection system, etc., of the camera 2. Then, the coordinates-associating part 10 stores these correspondence relationships in an input image/space model correspondence map 40 and a space model/processing-target image correspondence map 41.

It should be noted that the coordinates-associating part 10 omits associating the coordinates on the space model MD and the coordinates on the processing-target image plane R3 with each other and also omits storing the correspondence relationship in the space model/processing-target image correspondence map 41.

Moreover, the coordinates-associating part 10 performs the same process with respect to an input distance image taken by the distance image sensor. In such a case, the camera, the input image plane and the processing-target image plane are substituted by the input image sensor, the input distance image plane and the processing-target distance image plane, respectively. The same applies in the description mentioned below.

The image-creating part 11 is a part to create an output image. In the present embodiment, the image-creating part 11 associates the coordinates on the processing-target image plane R3 and the coordinates on the output image plane on which the output image is positioned with each other by applying, for example, a scale conversion, an affine conversion, or a distortion conversion to the processing-target image. Then, the image-creating part 11 stores the correspondence relationship in the processing-target image/output image correspondence map 42 of the storage part 4. Then, the image-creating part 11 creates an output image by relating a value of each pixel in the output image to a value of each pixel in the input image while referring to the input image/space model correspondence map 40 and the space model/processing-target image correspondence map 41. The value of each pixel is, for example, a brightness value, a color phase value, a chroma value, etc.

Moreover, the image-creating part 11 associates the coordinates on the processing-target image plane R3 and the coordinates on the output image plane on which the output image is positioned with each other based on various parameters of a virtual camera that are input through the input part 3. The various parameters with respect to the virtual camera are, for example, an optical center, a focal distance, a CCD size, an optical direction axis vector, a camera horizontal direction vector, a projection system, etc., of the virtual camera. Then, image-creating part 11 stores the correspondence relationship in the processing-target image/output image correspondence map 42 of the storage part 4. Then, the image-creating part 11 creates an output image by relating a value of each pixel in the output image to a value of each pixel in the input image while referring to the input image/space model correspondence map 40 and the space model/processing-target image correspondence map 41.

It should be noted that the image-creating part 11 may create the output image by changing a scale of the processing-target image without using a virtual camera.

Moreover, when the image-creating part 11 does not create the processing-target image, the image creating part 11 associates the coordinates on the space model MD and the coordinates on the output image plane with each other in accordance with the image conversion process applied. Then, the image-creating part 11 creates the output image by relating a value of each pixel in the output image to a value of each pixel in the input image while referring to the input image/space model correspondence map 40. In this case, the image-creating part 11 omits associating the coordinates on the processing-target image plane R3 and the coordinates on the output image plane with each other and also omits storing the correspondence relationship in the processing-target image/output image correspondence map 42.

Moreover, the image-creating part 11 performs the same process with respect to the input distance image or the processing-target distance image. In such a case, the output image plane is substituted by the output distance image plane. The same applies in the description mentioned below.

The distance image synthesizing part 12 is a part to synthesize an image regarding the camera and an image regarding the distance image sensor. For example, the distance image synthesizing part 12 synthesizes the output image, which is created by the image-creating part 11 and based on the input image of the camera 2, and the output distance image, which is based on the input distance image of the distance image sensor 6. It should be noted that details of the distance image synthesizing part 12 will be mentioned later.

Next, a description is given of an example of a specific process by the coordinates-associating part 10 and the image-creating part 11.

For example, the coordinates-associating part 10 can associates the coordinates on the input image plane and the coordinates on the space model with each other by using the Hamilton's quaternion.

Figure 5:
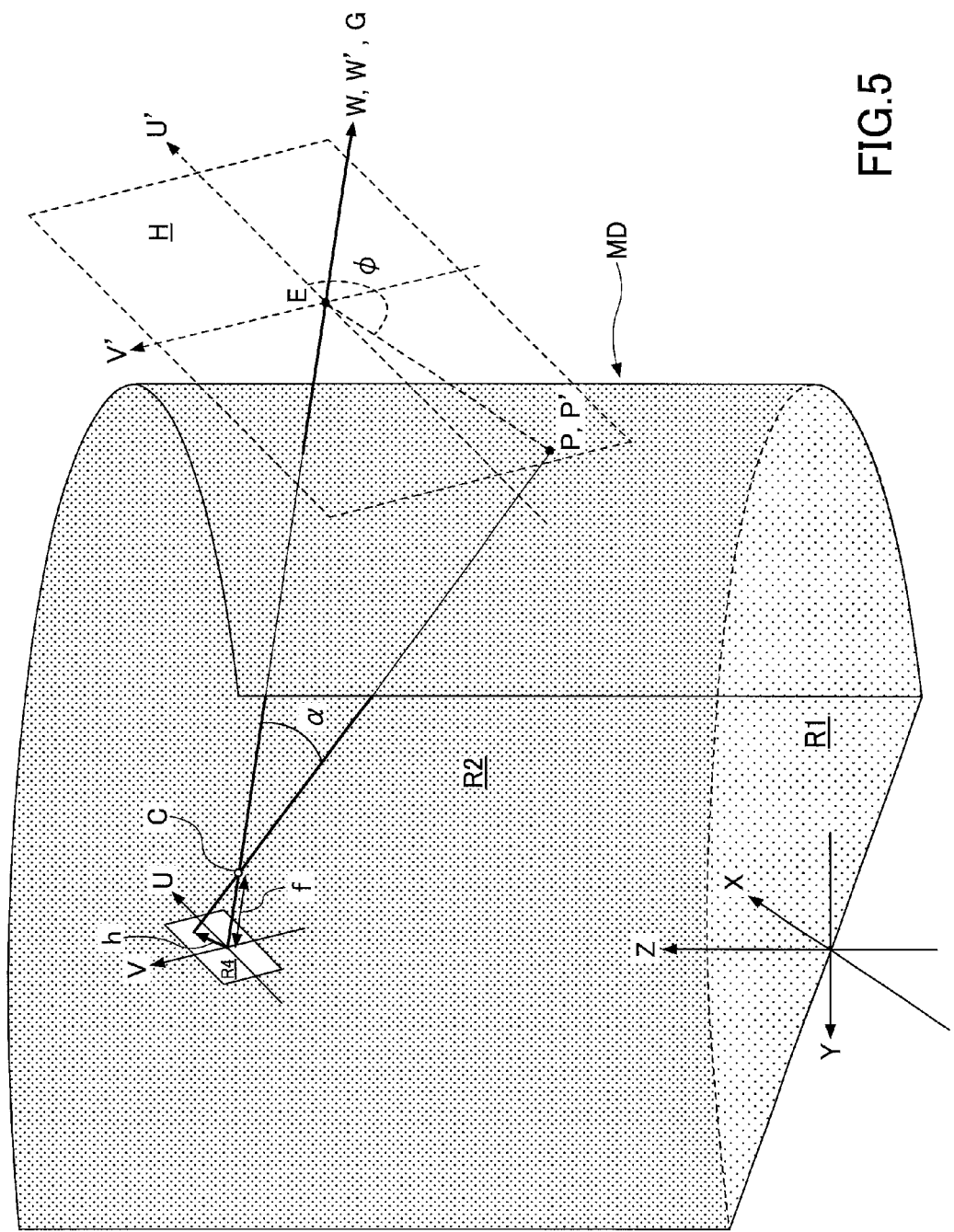
FIG. 5 is an illustration for explaining a correspondence between coordinates on the input image plane and coordinates on the space model.

FIG. 5 is a view for explaining a correspondence between the coordinates on the input image plane and the coordinates on the space model. The input image plane of the camera 2 is expressed as a single plane having an optical center C of the camera 2 as an original point in a UVW rectangular coordinate system. The space model is expressed as cubic planes in an XYZ rectangular coordinate system.

First, the coordinates-associating part 10 rotates the XYZ coordinate system so as to cause the X-axis to be coincident with the U-axis, the Y-Axis to be coincident with the V-axis and the Z-axis to be coincident with the −W-axis after parallel-moving the original point of the XYZ coordinate system to the optical center C (the original point of the UVW coordinate system). This is to convert the coordinates (coordinates on the XYZ coordinate system) on the space model into the coordinates (coordinates on the UVW coordinates system) on the input image plane. It should be noted that the sign "−" of the "−W-axis" means that the direction of the Z-axis is opposite to the direction of the −W-axis. This is because ahead of a camera is set to a +W direction in the UVW coordinate system and a vertical downward direction is set to a −Z direction in the XYZ coordinate system.

If there are a plurality of cameras 2, each of the cameras 2 has an individual UVW coordinate system. Thereby, the coordinates-associating part 10 translates and rotates the XYZ coordinate system with respect to each of the plurality of UVW coordinate systems.

The above-mentioned conversion is realized by translating the XYZ coordinate system so that the optical center C of the camera 2 becomes the original point of the XYZ coordinate system, and, thereafter, rotating the XYZ coordinate system so that the X-axis coincides with the −W-axis and further rotating the XYZ coordinate system so that the X-axis coincides with the U-axis. Therefore, the coordinates-associating part 10 integrates the two rotations into a single rotation operation by describing the conversion by Hamilton's quaternion.

By the way, a rotation to cause a certain vector A to be in coincident with a different vector B corresponds to a process of rotating by an angle formed between the vector A and the vector B using a normal line of a plane defined by the vector A and the vector B. When the rotating angle is set to $\theta$, the angle $\theta$ is expressed by an inner product of the vector A and the vector B and is as follows.

$$\theta = \cos^{-1}\left(\frac{A \cdot B}{|A||B|}\right) \quad \text{[Formula 1]}$$

Moreover, the unit vector N of the normal line of the plane defined by the vector A and the vector B is expressed by an outer product of the vector A and the vector B and is as follows.

$$N = \frac{A \times B}{|A||B|\sin\theta} \quad \text{[Formula 2]}$$

It should be noted that when each of i, j and k is an imaginary number unit, the quaternion is a hypercomplex number satisfying the following relationship.

$$ii = jj = kk = ijk = -1 \quad \text{[Formula 3]}$$

In the present embodiment, the quaternion Q is expressed as follows, where a real component is t and pure imaginary components are a, b and c.

$$Q = (t; a, b, c) = t + ai + bj + ck \quad \text{[Formula 4]}$$

The conjugate quaternion of the quaternion Q is expressed as follows.

$$Q^* = (t; -a, -b, -c) = t - ai - bj - ck \quad \text{[Formula 5]}$$

The quaternion Q can express a three-dimensional vector (a, b, c) by the pure imaginary components a, b and c while setting the real component t to 0 (zero). In addition, a rotating operation with an arbitrary vector as an axis can be expressed by each component t, a, b and c.

Further, the quaternion Q can express the consecutive plurality of numbers of rotating operation as a single rotation by integrating the plurality rotating operations. For example, a point D (ex, ey, ez), which is an arbitrary point S (sx, sy, sz) rotated by an angle θ with an arbitrary unit vector C (l, m, n) as an axis, can be expressed as follows.

$$D = (0; ex, ey, ez) = QSQ^* \quad \text{[Formula 6]}$$

where, $$S = (0; sx, sy, sz),$$

$$W = \left(\cos\frac{\theta}{2}; l\sin\frac{\theta}{2}, m\sin\frac{\theta}{2}, n\sin\frac{\theta}{2}\right)$$

Here, in the present embodiment, when the quaternion expressing a rotation, which causes the Z-axis to be coincident with the −W-axis, is Q, the point X on the X-axis in the XYZ coordinates system is moved to a point X'. Therefore, the point X' is expressed by the following relationship.

$$X' = Q_z X Q_z^* \quad \text{[Formula 7]}$$

Moreover, in the present embodiment, when the quaternion expressing a rotation, which causes a line connecting the point X' on the X-axis and the original point to be coincident with the U-axis is $Q_X$, the quaternion R expressing "a rotation to cause the Z-axis to be coincident with the −W-axis and further cause the X-axis to be coincident with the U-axis" is expressed by the following relationship.

$$R = Q_X Q_z \quad \text{[Formula 8]}$$

The coordinate P', when arbitrary coordinate P on the space model (XYZ coordinate system) is expressed by the coordinates on the input image plane (UVW coordinate system), is expressed by the following relationship $$P' = RPR^* \quad \text{[Formula 9]}$$

Additionally, because the quaternion R is a constant of each of the cameras 2, the coordinates-associating part 10 can convert the coordinates on the space model (the XYZ coordinates system) into the coordinates on the input image plane (the UVW coordinates system) by merely performing the operation.

After converting the coordinates on the space model (the XYZ coordinate system) into the coordinates on the input image plane (the UVW coordinate system), the coordinates-associating part 10 computes an incident angle α formed by a line segment CP' connecting the optical center C (coordinates on the UVW coordinates system) of the camera 2 and coordinate P', which is arbitrary coordinate P on the space model expressed by the UVW coordinates system, and the optical axis G of the camera 2.

Moreover, the coordinates-associating part 10 computes an argument φ and a length of a line segment EP', the argument φ being formed by the line segment EP', which connects the coordinates P' and an intersecting point E of a plane H and an optical axis G in the plane H, which is parallel to the input image plane R4 (for example, a CCD surface) and containing the coordinates P', and a U'-axis in the plane H.

In an optical system of a camera, normally, an image height h is a function of an incident angle α and a focal distance f. Accordingly, the coordinate correspondence part 10 computes the image height h by selecting an appropriate projection system such as a normal projection (h=f tan α), an orthogonal projection (h=f sin α), a stereographic projection (h=2 f tan(α/2)), an equisolid angle projection (h=f sin(α/2)), an equidistant projection (h=fα), etc.

Thereafter, the coordinates-associating part 10 decomposes the image height h to a U-component and a V-component on the UV coordinates system according to an argument φ, and divides them by a numerical value corresponding to a pixel size per one pixel of the input image plane R4. Thereby, the coordinates-associating part 10 can associate the coordinates P (P') on the space model MD and the coordinates on the input image plane R4 with each other.

It should be noted that when the pixel size per one pixel in the U-axis direction of the input image plane R4 is set to au, and the pixel size per one pixel in the V-axis direction of the input image plane R4 is set to av, the coordinates (u, v) on the input image plane R4 corresponding to the coordinates P (P') on the space model MD is expressed by the following formulas.

$$u = \frac{h\cos\varphi}{a_U} \quad \text{[Formula 10]}$$

$$v = \frac{h\sin\varphi}{a_V} \quad \text{[Formula 11]}$$

As mentioned above, the coordinates-associating part 10 causes the coordinates on the space model MD to correspond to the coordinates on one or more input image planes R4 existing for each camera, and relates the coordinates on the space model MD, a camera identifier, and the coordinates on the input image plane R4 to each other, and stores the correspondence relationship in the input image/space model correspondence map 40.

Because the coordinates-associating part 10 operates the conversion of coordinates by using the quaternion, the coordinates-associating part 10 provides an advantage in that a gimbal lock is not generated unlike in a case where a conversion of coordinates is operated using the Euler angle. However, the coordinates-associating part 10 is not limited to one performing an operation of conversion of coordinates using a quaternion, and the conversion of coordinates may be operated using the Euler angle.

If it is possible to cause a correspondence to coordinates on a plurality of input image planes R4, the coordinates-associating part 10 may cause the coordinates P (P') to correspond to the coordinates on the input image plane R4 with respect to a camera of which an incident angle is smallest, or may cause the coordinates P (P') to correspond to the coordinates on the input image plane R4 selected by an operator.

Next, a description is given of a process of re-projecting the coordinates on the curved surface area R2 (coordinates having a component in a Z-axis direction), from among the coordinates on the space model MD, onto the processing-target image plane R3 on the XY plane.

FIGS. 6A through 6D are illustrations for explaining the correspondence between coordinates according to the coordinates-associating part 10. FIG. 6A is an illustration illustrating a correspondence relationship between the coordinates on the input image plane R4 of the camera 2 using a normal projection (h=f tan α) and the coordinates on the space model MD. The coordinates-associating part 10 associates both coordinates with each other by causing each of the line segments, which connect coordinates on the input image plane R4 of the camera 2 and the coordinates on the space model MD corresponding to the coordinates on the input image plane R4 to each other, passes through the optical center C of the camera 2.

In the example of FIG. 6A, the coordinates-associating part 10 associates the coordinates K1 on the input image plane R4 of the camera 2 with the coordinates L1 on the plane surface area R1 of the space model MD, and associates the coordinates K2 on the input image plane R4 of the camera 2 with the coordinates L2 on the curved surface area R2 of the space model MD. In this situation, both the line segment K1-L1 and the line segment K2-L2 pass through the optical center C of the camera 2.

It should be noted that when the camera 2 uses projection systems (for example, an orthogonal projection, a stereographic projection, an equisolid angle projection, an equidistant projection, etc.) other than the normal projection system, the coordinates-associating part 10 associates the coordinates K1 and K2 on the input image plane R4 with the coordinates L1 and L2 on the space model MD according to the respective projection systems.

Specifically, the coordinates-associating part 10 associates the coordinates on the input image plane and the coordinates on the space model MD with each other based on a predetermined function (for example, an orthogonal projection (h=f sin α), a stereographic projection (h=2 f tan(α/2)), an equisolid angle projection (h=f sin(α/2)), an equidistant projection (h=fα), etc.). In this case, the line segment K1-L1 and the line segment K2-L2 do not pass through the optical center C of the camera 2.

FIG. 6B is an illustration illustrating a correspondence relationship between the coordinates on the curved surface area R2 of the space model MD and the coordinates on the processing-target image plane R3. The coordinates-associating part 10 introduces a group of parallel lines PL, which are a group of parallel lines PL positioned on the XZ-plane and form an angle β with the processing-target image plane R3. Then, the coordinates-associating part 10 associates both coordinates with each other so that both the coordinates on the curved surface area R2 of the space model MD and the coordinates on the processing-target image plane R3 corresponding to the coordinates on the curved surface area R2 are positioned on one of the parallel lines.

In the example of FIG. 6B, the coordinates-associating part 10 associates both coordinates with each other so that the coordinates L2 on the curved surface area R2 of the space model MD and the coordinates M2 on the processing-target image plane R3 are positioned on a common parallel line.

The coordinates-associating part 10 can associate the coordinates on the plane surface area R1 of the space model MD with the coordinates on the processing-target image plane R3 using a group of parallel lines PL, similar to the coordinates on the curved surface area R2. However, in the example of FIG. 6B, the flat surface area R1 and the processing-target image plane R3 lie in a common plane. Therefore, the coordinates L1 on the flat surface area R1 on the space model MD and the coordinates M1 on the processing-target image plane R3 have the same coordinate value.

As mentioned above, the coordinates-associating part 10 associates the spatial coordinates on the space model MD and the projection coordinates on the processing-target image plane R3 with each other, and stores the coordinates on the space model MD and the coordinates on the processing-target image R3 in the space model/processing-target image correspondence map 41 by relating them to each other.

FIG. 6C is an illustration illustrating a correspondence relationship between the coordinates on the processing-target image plane R3 and the coordinates on the output image plane R5 of the virtual camera 2V using, as an example, a normal projection (h=f tan α). The image-creating part 11 associates both coordinates with each other so that each of the line segments connecting the coordinates on the output image plane R5 of the virtual camera 2V and the coordinates on the processing-target image plane R3 corresponding to the coordinates on the output image plane R5 passes through the optical center CV of the virtual camera 2V.

In the example of FIG. 6C, the image-creating part 11 associates the coordinates N1 on the output image plane R5 of the virtual camera 2V with the coordinates M1 on the processing-target image plane R3 (the flat surface area R1 of the space model MD), and associates the coordinates N2 on the output image plane R5 of the virtual camera 2V with the coordinates M2 on the processing-target image plane R3. In this situation, both the line segment M1-N1 and the line segment M2-N2 pass through the optical center CV of the virtual camera 2.

If the virtual camera 2 uses projection systems (for example, an orthogonal projection, a stereographic projection, an equisolid angle projection, an equidistant projection, etc.) other than the normal projection, the image-creating part 11 associates the coordinates N1 and N2 on the output image plane R5 of the virtual camera 2V with the coordinates M1 and M2 on the processing-target image plane R3 according to the respective projection system.

Specifically, the image-creating part 11 associates the coordinates on the output image plane R5 and the coordinates on the processing-target image plane R3 with each other based on a predetermined function (for example, an orthogonal projection (h=f sin α), a stereographic projection (h=2 f tan(α/2)), an equisolid angle projection (h=f sin(α/2)), an equidistant projection (h=fα), etc.). In this case, the line segment M1-N1 and the line segment M2-N2 do not pass through the optical center CV of the virtual camera 2V.

As mentioned above, the image-creating part 11 associates the coordinates on the output image plane R5 and the coordinates on the processing-target image plane R3 with each other, and stores the coordinates on the output image plane R5 and the coordinates on the processing-target image R3 in the processing-target image/output image correspondence map 42 by relating them to each other. Then, the image creating part 11 creates the output image by relating a value of each pixel in the output image to a value of each pixel in the input image while referring to the input image/space model correspondence map 40 and the space model/processing-target image correspondence map 41.

It should be noted that FIG. 6D is an illustration of a combination of FIG. 6A through FIG. 6C, and illustrates a mutual positional relationship between the camera 2, the virtual camera 2V, the plane surface area R1 and the curved surface area R2 of the space model MD, and the processing-target image plane R3.

Next, a description is given, with reference to FIGS. 7A and 7B, of an action of the group of parallel lines, which the coordinates-associating part 10 introduces to associate the coordinates on the space model MD with the coordinates on the processing-target image plane R3.

FIG. 7A is an illustration of a case where an angle β is formed between the group of parallel lines PL positioned on the XZ-plane and the processing-target image plane R3. On the other hand, FIG. 7B is an illustration of a case where an angle β1 (β1>β) is formed between the group of parallel lines PL positioned on the XZ-plane and the processing-target image plane R3. The coordinates La through Ld on the curved surface area R2 of the space model MD in FIGS. 7A and 7B correspond to the coordinates Ma through Md on the processing-target image plane R3, respectively. The intervals of the coordinates La through Ld in the illustration of FIG. 7A are equal to the intervals of the coordinates La through Ld in the illustration of FIG. 7B, respectively. It should be noted that although it is assumed that the group of parallel lines PL exist on the XZ-plane for the purpose of simplification of description, actually, the parallel lines radially extend from all points on the Z-axis toward the processing-target image plane R3. The Z-axis in this case is referred to as "re-projection axis".

As illustrated in FIGS. 7A and 7B, the intervals of the coordinates Ma through Md on the processing-target image plane R3 decease linearly as the angle between the group of parallel lines PL and processing-target image plane R3 increases. That is, the intervals of the coordinates Ma through Md decrease uniformly irrespective of the distance between the curved surface area R2 of the space model MD and each of the coordinates Ma through Md. On the other hand, because a conversion to the group of coordinates on the processing-target image plane R3 is not performed in the example illustrated in FIGS. 7A and 7B, the intervals of the group of coordinates on the flat surface area R1 of the space model MD do not change.

The change in the intervals of the group of coordinates means that only an image portion corresponding to the image projected on the curved surface area R2 of the space model MD from among the image portions on the output image plane R5 (refer to FIG. 6C) is enlarged or reduced linearly.

Next, a description is given, with reference to FIGS. 8A and 8B, of an alternative example of the group of parallel lines PL, which the coordinates correspondence part 10 introduces to cause the coordinates on the space model MD to correspond to the coordinates on the processing-target image plane R3.

FIG. 8A is an illustration of a case where all of a group of auxiliary lines AL positioned on the XZ-plane extend from a start point T1 on the Z-axis toward the processing-target image plane R3. On the other hand, FIG. 8B is an illustration of a case where all of the group of auxiliary lines AL positioned on the XZ-plane extend from a start point T2 on the Z-axis toward the processing-target image plane R3. The coordinates La through Ld on the curved surface area R2 of the space model MD in the illustration of FIG. 8A and the illustration FIG. 8B correspond to the coordinates Ma through Md on the processing-target image plane R3, respectively. In the example illustrated in the illustration of FIG. 8A, the coordinates Mc and Md are not illustrated in the figure because they are out of range of the processing-target image plane R3. Additionally, the intervals of the coordinates La through Ld in the illustration of FIG. 8A are equal to the intervals of the coordinates La through Ld in the illustration of FIG. 8B, respectively. It should be noted that although the group of auxiliary lines AL are supposed to be on the XZ-plane for the purpose of simplification of description, actually, the auxiliary lines radially extend from an arbitrary point on the Z-axis toward the processing-target image plane R3. Similar to the example illustrated in FIGS. 7A and 7B, the Z-axis in this case is referred to as "re-projection axis".

As illustrated in FIGS. 8A and 8B, the intervals of the coordinates Ma through Md on the processing-target image plane R3 decease nonlinearly as the distance (height) between the start point of the group of auxiliary lines AL and the original point O increases. That is, a degree of decrease of each of the intervals increases as the distance between the curved surface area R2 of the space model MD and each of the coordinated Ma through Md increases. On the other hand, because a conversion to the group of coordinates on the processing-target image plane R3 is not performed in the example illustrated in FIGS. 8A and 8B, the intervals of the group of coordinates on the plane surface area R1 of the space model MD do not change.

Similar to the case of the group of parallel lines PL, the change in the intervals of the group of coordinates means that only an image portion corresponding to the image projected on the curved surface area R2 of the space model MD from among the image portions on the output image plane R5 (refer to FIG. 6C) is enlarged or reduced nonlinearly.

As explained above, the image-creating device 100 can linearly or nonlinearly enlarge or reduce an image portion (for example, a horizontal image) of the output image corresponding to the image projected on the curved surface area R2 of the space model MD without giving an influence to an image portion (for example, a road surface image) of the output image corresponding to the image projected on the flat surface area R1 of the space model MD. Thereby, the image-creating device 100 can rapidly and flexibly enlarged or reduced an object positioned around the shovel 60 (an object in an image when viewing a periphery in a horizontal direction from the shovel 60) without giving an influence to a road image (a virtual image when viewing the shovel from directly above) in the vicinity of the shovel 60, and can improve visibility of a blind spot for the shovel 60.

Figure 9:
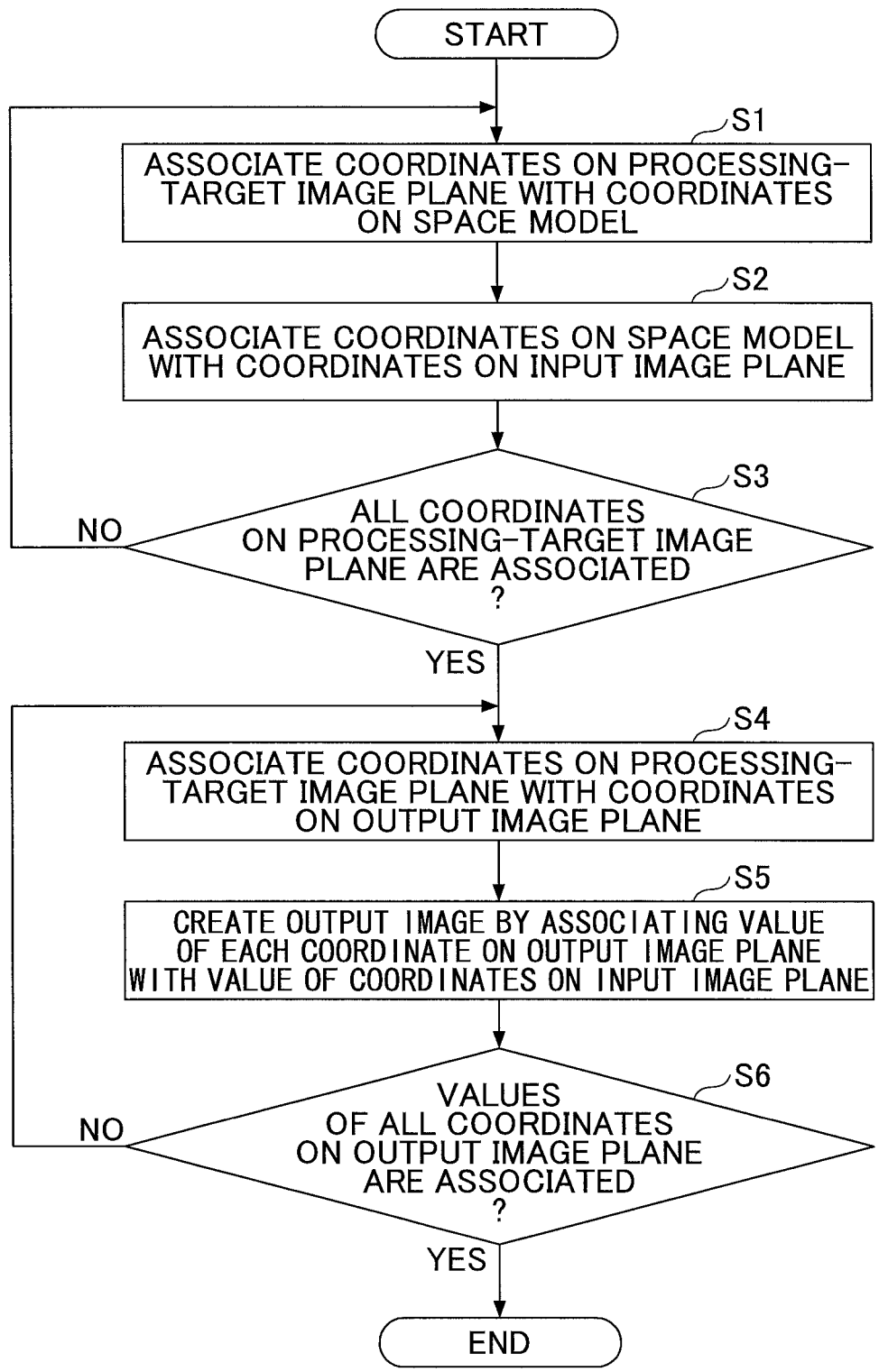
FIG. 9 is a flowchart of a processing-target image creating process and an output image creating process.

Next, a description will be given, with reference to FIG. 9, of a process of creating a processing-target image by the image-creating device 100 (hereinafter, referred to as "processing-target image creating process") and a process of creating an output image using the created processing-target image (hereinafter, referred to as "output image creating process"). It should be noted that FIG. 9 is a flowchart of the processing-target creating process (step S1 through step S3) and the output image creating process (step S4 through step S6). Additionally, the arrangement of the camera 2 (the input image plane R4), the space model (the flat surface area R1 and the curved surface area R2) and the processing-target image plane R3 is previously determined.

First, the control part 1 causes the coordinates-associating part 10 to associates the coordinates on the processing-target image plane R3 and the coordinates on the space model MD with each other (step S1).

Specifically, the coordinates-associating part 10 acquires an angle formed between the group of parallel lines PL and the processing-target image plane R3. Then the coordinates-associating part 10 computes a point at which one of the group of parallel lines PL extending from the coordinate point on the processing-target image plane R3 intersects with the curved surface area R2 of the space model MD. Then, the coordinates-associating part 10 derives a coordinate point on the curved surface area R2 corresponding to the computed point as a coordinate point on the curved surface area R2 corresponding to a coordinate point on the processing-target image plane R3, and stores a correspondence relationship therebetween in the space model/processing-target image correspondence map 41. The angle formed between the group of parallel lines PL and the processing-target image plane R3 may be a value previously stored in the storage part 4, etc., or may be a value dynamically input by the operator through the input part 3.

When the coordinates on the processing-target image plane R3 coincides with the coordinates on the flat surface area R1 on the space model MD, the coordinates-associating part 10 derives the coordinates on the flat surface area R1 as the coordinates corresponding to the coordinates on the processing-target image plane R3, and stores a correspondence relationship therebetween in the space model/processing-target image correspondence map 41.

Thereafter, the control part 1 causes the coordinates-associating part 10 to associate the coordinates on the space model MD derived by the above mentioned process and the coordinates on the input image plane R4 with each other (step S2).

Specifically, the coordinates-associating part 10 acquires the coordinate point of the optical center C of the camera 2 using a normal projection (h=f tan α). Then, the coordinates-associating part 10 computes a point at which a line segment extending from a coordinate point on the space model MD, which is a line segment passing through the optical center C, intersects with the input image plane R4. Then, the coordinates-associating part 10 derives a coordinate point on the input image plane R4 corresponding to the computed point as a coordinate point on the input image plane R4 corresponding to the coordinate point on the space model MD, and stores a correspondence relationship therebetween in the input image/space model correspondence map 40.

Thereafter, the control part 1 determines whether or not all of the coordinate points on the processing-target image plane R3 are associated with the coordinate points on the space model MD and the coordinate points on the input image plane R4 (step S3). Then, if the control part 1 determines that all of the coordinate points have not been associated (NO of step S3), the control part 1 repeats the process of step S1 and step S2.

On the other hand, if it is determined that all of the coordinate points have been associated (YES of step S3), the control part 1 causes the processing-target image creating process to end and, thereafter, causes the output image creating process to start. Then, the control part 1 causes the image-creating part 11 to associate the coordinates on the processing-target image plane R3 and the coordinates on the output image plane R5 with each other (step S4).

Specifically, the image-creating part 11 creates an output image by applying a scale conversion, an affine conversion or a distortion conversion to a processing-target image. Then, the image-creating part 11 stores a correspondence relationship between the coordinates on the processing-target image plane R3 and the coordinates on the output image plane R5 in the processing-target image/output image correspondence map 42. The correspondence relationship is determined according to the applied scale conversion, affine conversion, or distortion conversion.

Alternatively, when creating the output image using the virtual camera 2V, the image-creating part 11 may compute the coordinates on the output image plane R5 from the coordinates on the processing-target image plane R3, and may store a correspondence relationship therebetween in the processing-target image/output image correspondence map 42.

Alternatively, when creating the output image using the virtual camera 2V using a normal projection (h=f tan α), the image-creating part 11 acquires the coordinate point of the optical center CV of the virtual camera 2V. Then, the image-creating part 11 computes a point at which a line segment extending from a coordinate point on the output image plane R5, which line segment passes through the optical center CV, and intersects with the processing-target image plane R3. Then, the image-creating part 11 derives the coordinates on the processing-target image plane R3 corresponding to the computed point as a coordinate point on the processing-target image plane R3 corresponding to the coordinate point on the output image plane R5. As mentioned above, the image-creating part 11 may store a correspondence relationship therebetween in the processing-target image/output image correspondence map 42.

Thereafter, the image-creating part 11 of the control part 1 refers to the input image/space model correspondence map 40, the space model/processing-target image correspondence map 41 and the processing-target image/output image correspondence map 42. Then, the image-creating part 11 follows the correspondence relationship between the coordinates on the input image plane R4 and the coordinates on the space model MD, the relationship between the coordinates on the space model MD and the coordinates on the processing-target image plane R3 and the correspondence relationship between the processing-target image plane R3 and the coordinates on the output image plane R5. Then, the image-creating part 11 acquires values (for example, a brightness value, a color phase value, a chroma value, etc.) defined by the coordinates on the input image plane R4 corresponding to the coordinates on the output image plane R5, and uses the acquired values as a value of each coordinate on the corresponding output image plane R5 (step S5). It should be noted that, when a plurality of coordinates on a plurality of input image planes R4 correspond to one coordinate point on the output image plane R5, the image-creating part 11 may derive statistical values based on each of the values of the plurality of coordinates on the plurality of input image planes R4, and may use the statistical values as the values of the coordinates on the output image plane R5. The statistical values are, for example, a mean value, a maximum value, a minimum value, a median value, etc.

Thereafter, the control part 1 determines whether or not all of the values of the coordinates on the output image plane R5 are associated with the values of the coordinates on the input image plane R4 (step S6). If it is determined that all of the values of the coordinates have not been associated (NO of step S4), the control part 1 repeats the process of step S5.

On the other hand, if it is determined that all of the values of the coordinates have been associated (YES of step S6), the control part 1 creates an output image, and causes the series of processes to end.

It should be noted that when the image-creating device 100 does not create a processing-target image, the processing-target image creating process is omitted. In this case, the "coordinates on the processing-target image plane" in step S4 of the output image creating process is substitutionally read as "coordinates on the space model".

According to the above-mentioned structure, the image-creating device 100 is capable of creating the processing-target image and the output image that can cause the operator to intuitively grasp the positional relationship between the shovel 60 and a peripheral object of the shovel 60.

Additionally, the image-creating device 100 performs coordinate associating operations in reverse going from the processing-target image plane R3 to the input image plane R4 through the space model MD. Thereby, the image-creating device 100 is capable of surely causing each coordinate point on the processing-target plane R3 to correspond to one or more coordinate points on the input image plane R4. Therefore, a better quality processing-target image can be generated as compared to a case where a coordinate-associating operation is performed in an order from the input image plane R4 to the processing-target image plane R3 through the space model MD. It should be noted that when performing a coordinate-associating operation in an order from the input image plane R4 to the processing-target image plane R3 through the space model MD, each of the coordinate points on the input image plane R4 can be associated with one or more coordinate points on the processing-target image plane R3. However, there may be a case where a part of the coordinate points on the processing-target image plane R3 cannot be associated with any one of the coordinate points on the input image plane R4, and, in such a case, it is necessary to apply an interpolation process to the part of the coordinate points on the processing-target image plane R3.

Moreover, when enlarging or reducing only an image corresponding to the curved surface area R2 of the space model MD, the image-creating device 100 can realize a desired enlargement or reduction by merely rewriting only a part associated with the curved surface area R2 in the space model/processing-target image correspondence map 41 by changing the angle formed between the group of parallel lines PL and the processing-target image plane R3 without rewriting the contents of the input image/space model correspondence map 40.

Moreover, when changing an appearance of the output image, the image-creating device 100 is capable of creating a desire output image (a scale conversion image, an affine conversion image or a distortion conversion image) by merely rewriting the processing-target image/output image correspondence map 42 by changing various parameters regarding a scale conversion, an affine conversion or a distortion conversion without rewriting the contents of the input image/space model correspondence map 40 and the contents of the space model/processing-target image correspondence map 41.

Similarly, when changing a view point of the output image, the image-creating device 100 is capable of creating an output image (view point conversion image) which is viewed from a desired view point by merely rewriting the processing-target image/output image correspondence map 42 by changing values of various parameters of the virtual camera 2V without rewriting the contents of the input image/space model correspondence map 40 and the space model/processing-target image correspondence map 41.

Figure 10:
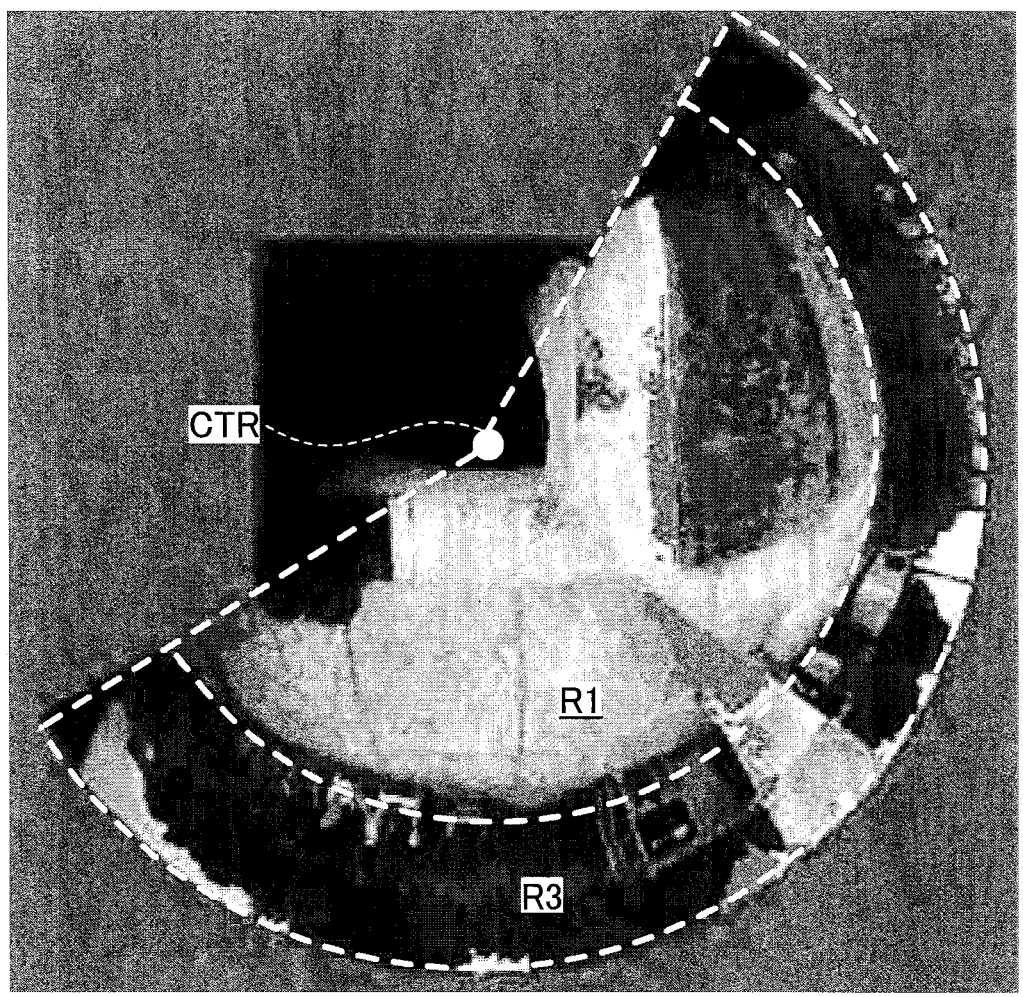
FIG. 10 is a photographic illustration of an output image.

FIG. 10 is an example of an output image created using input images of two cameras 2 (the right side camera 2R and the back side camera 2B) mounted on the shovel 60 displayed on the display part 5.

The image-creating device 100 creates a processing-target image by projecting the input images of the two cameras 2 onto the flat surface area R1 and the curved surface area R2 of the space model MD, respectively, and thereafter re-projecting them onto the processing-target image plane R3. Then, the image-creating device 100 creates an output image by applying an image conversion process (for example, a scale conversion process, an affine conversion process, a distortion conversion process, a view-point conversion process, etc.) to the created processing-target image. Thereby, the image-creating device 100 simultaneously displays an image of the vicinity of the shovel 60 from above the shovel 60 looking down (the image on the flat surface area R1) and an image of the periphery from the shovel in a horizontal direction (the image on the processing-target image plane R3).

It should be noted that, when the image-creating device 100 does not create the processing-target image, the output image is created by applying an image conversion process (for example, a view-point conversion process) to the image projected on the space model MD.

Additionally, the output image is trimmed in a circular shape so that an image when the shovel 60 performs a turning operation can be displayed in a natural way, and is created so that the center CTR of the circle lies on the cylinder center axis of the space model MD and on the turning axis PV of the shovel 60. In this case, the cylinder center axis of the space model MD may coincide with the re-projection axis or may not coincide with the re-projection axis.

It should be noted that the radius of the space model MD is, for example, 5 meters. Additionally, an angle formed between the group of parallel lines PL and the processing-target image plane R3 or a start point height of the group of auxiliary lines AL can be set so that, when an object (for example, a worker) is present at a position away from the turning center of the shovel 60 by a maximum reach distance (for example, 12 meters), the object is displayed sufficiently large (for example, larger than or equal to 7 millimeters) on the display part 5.

Further, in the output image, a CG image of the shovel 60 may be arranged so that the forward direction of the shovel 60 coincides with the upward direction of the screen of the display part 5 and the turning center thereof coincides with the center CTR. This is to make the positional relationship between the shovel 60 and the object appearing in the output image easily recognizable. It should be noted that a frame image including various kinds of information such as an orientation may be arranged around the output image.

Next, a description is given, with reference to FIGS. 11 through FIG. 18, of details of the output image created by the image-creating device 100.

Figure 11:
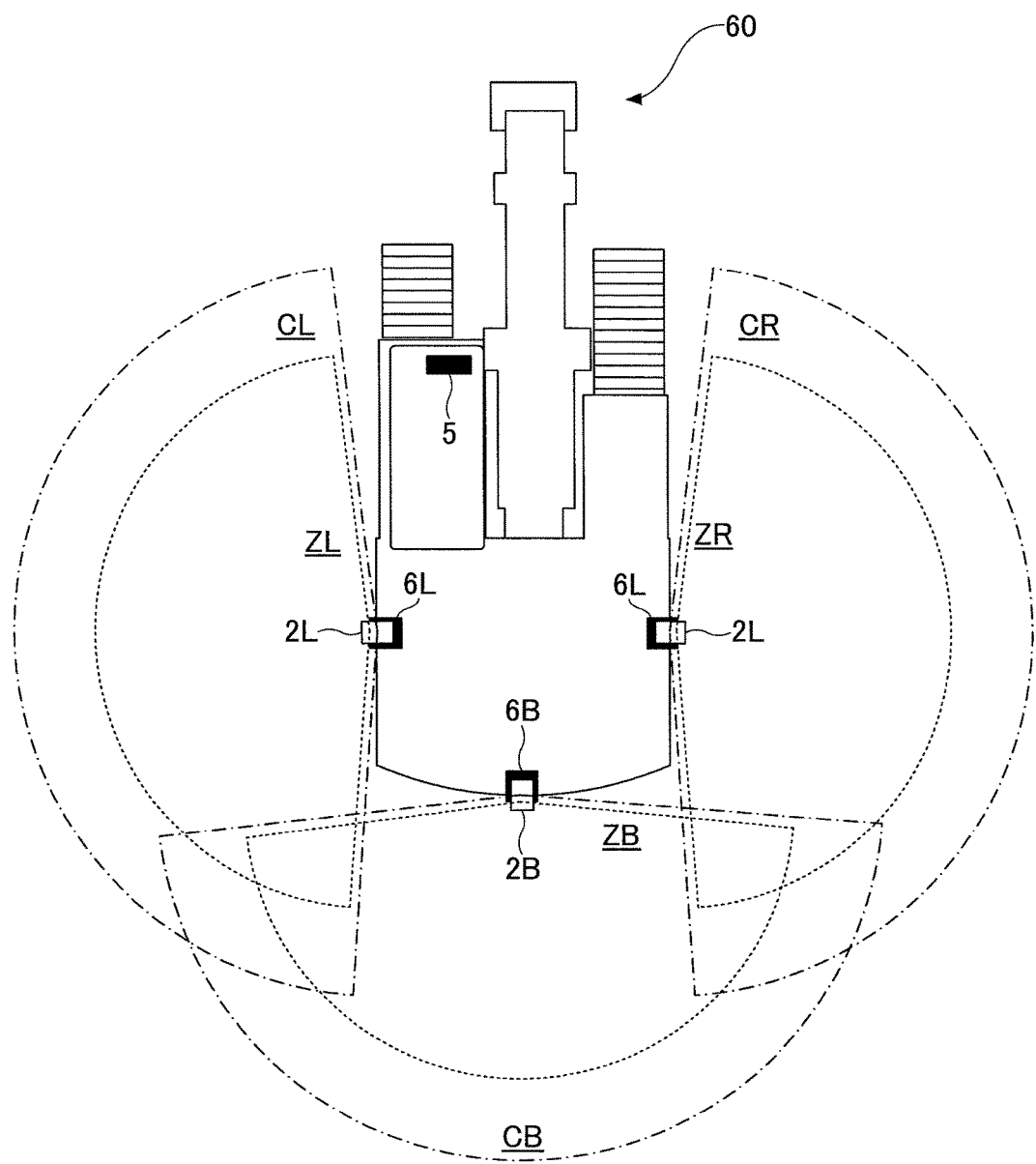
FIG. 11 is a plan view of a shovel equipped with an image-creating device having three cameras and three distance image sensors.

FIG. 11 is a plan view of the shovel 60 equipped with the image-creating device 100. In the embodiment illustrated in FIG. 11, the shovel 60 is equipped with three cameras 2 (left side camera 2L, right side camera 2R and back side camera 2B) and three distance image sensors 6 (left side distance image sensor 6L, right side distance image sensor 6R and back side distance image sensor 6B). Areas CL, CR, CB indicated by single-dashed chain lines in FIG. 11 illustrate imaging ranges of the left side camera 2L, the right side camera 2R and the back side camera 2B, respectively. It should be noted that areas ZL, ZR and ZB indicated by dotted lines in FIG. 11 indicate imaging ranges of a left side distance image sensor 6L, a right side distance image sensor 6L and a back side distance image sensor 6B, respectively.

Although the imaging ranges of the distance image sensors 6 are narrower than the imaging ranges of the cameras 2 in the present embodiment, the imaging ranges of the distance image sensors 6 may be equal to the imaging ranges of the cameras 2, and may be wider than the imaging ranges of the cameras 2. Additionally, although the imaging ranges of the distance image sensors 6 are located in the vicinity of the shovel 60 within the imaging ranges of the cameras 2, they may be in an area farther from the shovel 60.

FIGS. 12A through 12D are photographic illustrations of respective input images of the three cameras 2 mounted on the shovel 60 and an output image created using those input images.

The image-creating device 100 creates a processing target image by projecting the input images of the respective three cameras 2 onto the space model MD, the flat surface area R1 and the curved surface area R2 and further re-projecting them onto a processing target image plane R3. Additionally, the image-creating device 100 creates the output image by applying an image conversion process (for example, a scale conversion process, an affine conversion process, a distortion conversion process, a view point conversion process, etc.) to the created processing target image. As a result, the image-creating device 100 simultaneously displays an image of the vicinity of the shovel 60 viewed from above (an image in the flat surface area R1) and an image viewed from the shovel 60 in a horizontal direction (an image in the processing-target image plane R3). The image displayed in the center of the output image is a CG image 60CG of the shovel 60.

Each of the input image of the right side camera 2R illustrated in FIG. 12C and the input image of the back side camera 2B illustrated in FIG. 12D captures a person within an overlapping area of the imaging range of the right side camera 2R and the back side camera 2B (refer to an area R10 encircled by a double-dashed chain line in the input image of the right side camera 2R and an are R11 encircled by a double-dashed chain line in the input image of the back side camera 2B).

However, if the coordinates on the output image plane are associated with the coordinates on the input image plane with respect to the camera having a smallest incident angle, the output image causes the person in the overlapping area to disappear (refer to an area R12 encircled by a single-dashed chain line in the output image).

Thus, the image-creating device 100 causes the area with which the coordinates on the input image plane of the back side camera 2 is associated and the area with which the coordinates on the input image plane of the right side camera 2R is associated to be mixed in an output image portion corresponding to the overlapping area so as to prevent the person in the overlapping area from disappearing.

Figure 13A:
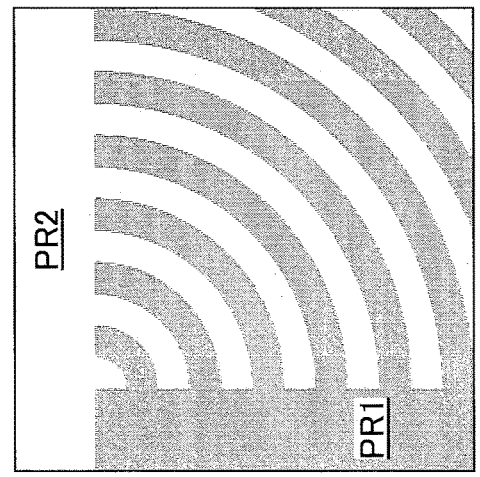
FIG. 13A is an illustration illustrating an output image portion corresponding to an overlapping area of an imaging range of a right side camera and an imaging area of a back side camera.
Figure 13B:
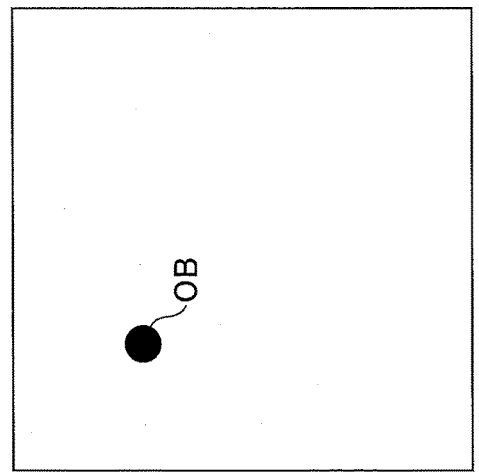
FIG. 13B is a plan view illustrating a state of a space area diagonally behind a shovel, which indicates a present state of a space area taken by both the back side camera and the right side camera.
Figure 13C:
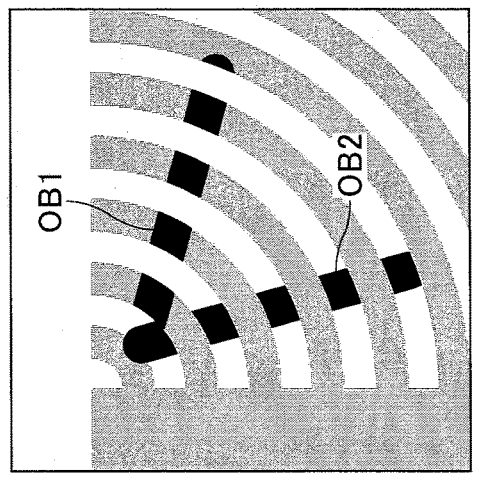
FIG. 13C is an illustration illustrating a portion of an output image created based on the input images acquired by the back side camera and the right side camera.

FIGS. 13A through 13C are illustrations for explaining an image disappear preventing process of preventing an object in the overlapping area of each of imaging ranges of two cameras 2 from disappearing.

FIG. 13A is an illustration illustrating an output image portion corresponding to the overlapping area of the imaging range of the right side camera 2R and the imaging area of the back side camera 2B, which corresponds to a square area R13 indicated by dashed lines in FIG. 12A.

Additionally, in FIG. 13A, an area PR1 painted in gray is an image area in which an input image portion of the back side camera 2B is arranged, and the coordinates on the output image plane corresponding to the area PR1 is associated with the coordinates on the input image plane of the back side camera 2B.

On the other hand, an area PR2 painted in white is an image area in which an input image portion of the right side camera 2R is arranged, and the coordinates on the output image plane corresponding to the area PR2 are associated with the coordinates on the input image plane of the right side camera 2R.

In the present embodiment, the area PR1 and the area PR2 are arranged to form a striped pattern, and boundary lines between the area PR1 and the area PR2 alternately arranged in the striped pattern are deter mined by concentric circles having the center coincides with the turning center of the shovel 60 on a horizontal plane.

FIG. 13B is a plan view illustrating a state of a space area located diagonally behind the shovel 60, which indicates the present state of the space area taken by both the back side camera 2B and the right side camera 2R. FIG. 13B also illustrates that there is a rod-like solid object OB located diagonally behind the shovel 60 to the right of the shovel 60.

FIG. 13C illustrates a portion of the output image created based on the input images acquired by actually taking images of the space area illustrated in FIG. 13B by the back side camera 2B and the right side camera 2R from the viewpoint of the shovel 60.

Specifically, an image OB1 represents the image of the solid object OB in the input image of the back side camera 2B appearing elongated in an extending direction of a line connecting the back side camera 2B and the solid object 2B according to a view point conversion for creating a ground surface image. That is, the image OB1 is a portion of the image of the solid object, which is displayed when an image of a ground surface in the output image is created using the input image of the back side camera 2B.

Additionally, an image OB2 represents the image of the solid object OB in the input image of the right side camera 2R appearing elongated in an extending direction of a line connecting the right side camera 2B and the solid object 2B according to a view point conversion for creating a ground surface image. The image OB2 is a portion of the image of the solid object OB, which is displayed when an image of a ground surface in the output image is created using the input image of the right side camera 2R.

As mentioned above, the image-creating device 100 causes the area PR1 with which the coordinates on the input image plane of the back side camera 2 is associated and the area PR2 with which the coordinates on the input image plane of the right side camera 2R is associated to be mixed in the overlapping area. As a result, the image-creating device 100 causes both of the two images OB1 and OB2 regarding the solid object OB to be displayed on the output image to prevent the object OB from disappearing in the output image.

Figure 14A:
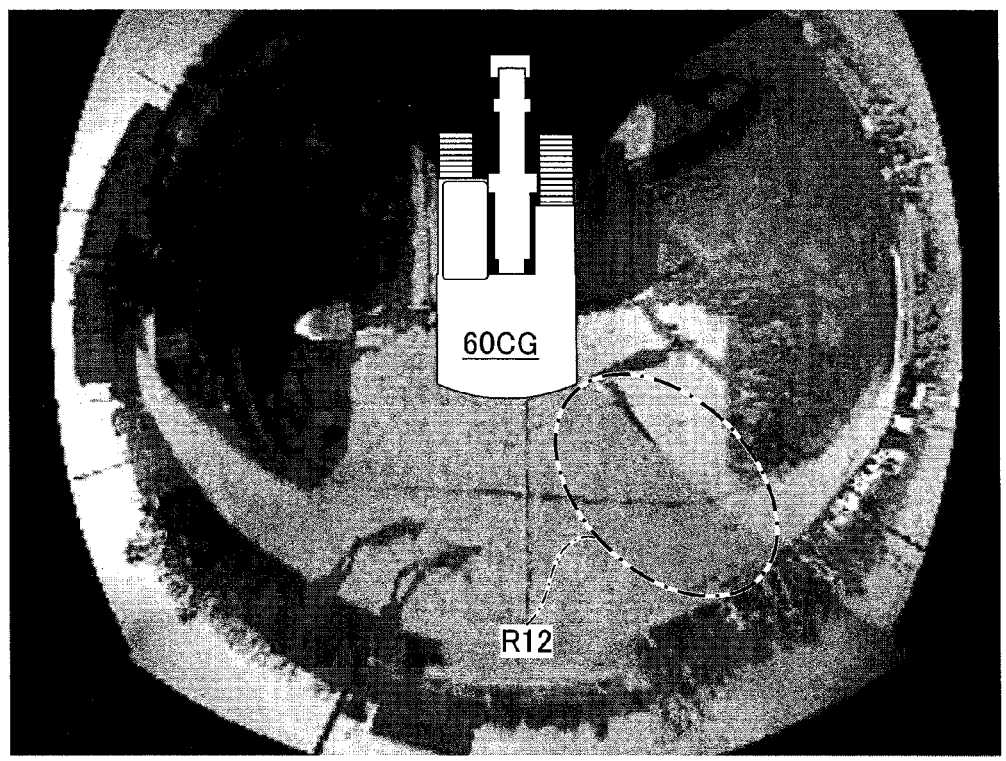
FIG. 14A is an enlarged photographic illustration of the output image illustrated in FIG. 12A.
Figure 14B:
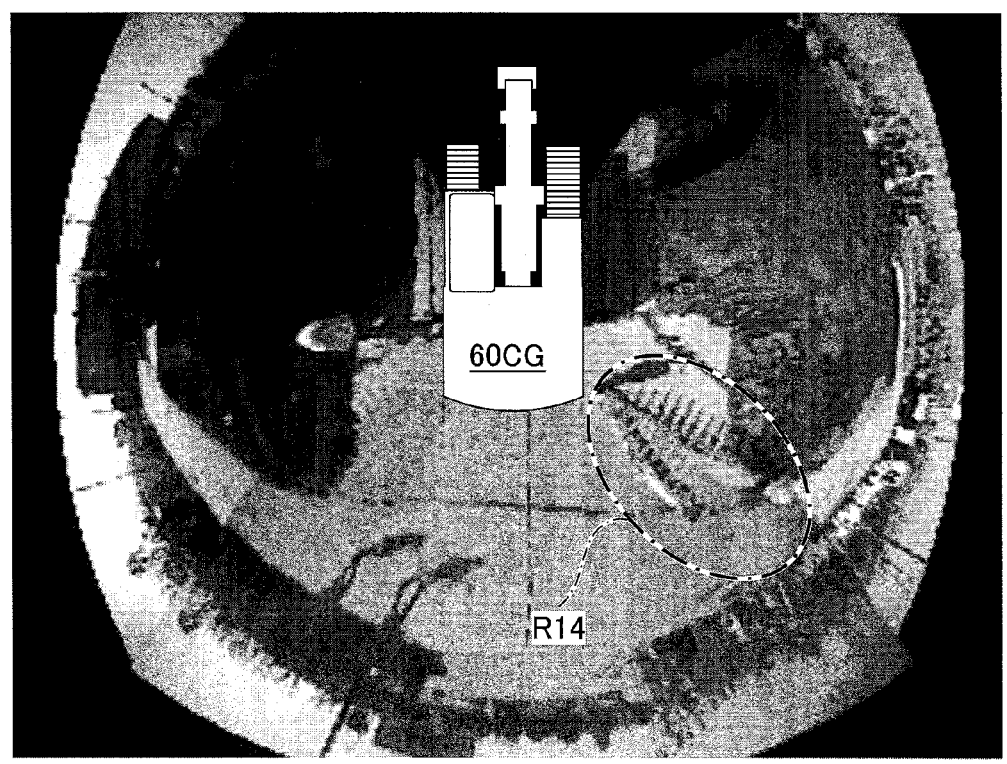
FIG. 14B is a photographic illustration of an output image obtained by applying an image disappearance preventing process to the output image of FIG. 14A.

FIG. 14A is an enlarged photographic illustration of the output image of FIG. 12A. FIG. 14B is a photographic illustration of an output image obtained by applying the image disappear preventing process to the output image of FIG. 12A. A person does not appear in an area R12 encircled by a single-dashed chain line in FIG. 14A, while the person is displayed without disappearing in an area R14 encircled by a single-dashed chain line in FIG. 14B.

Next, a description is given, with reference to FIGS. 15A through 15D, of an output distance image created by the image-creating device 100. FIGS. 15A through 15D are photographic illustrations of the input distance images of the respective three distance image sensors 6 mounted on the shovel 60 and an output distance image created using these input distance images.

The image-creating device 100 creates a processing target distance image by projecting the input distance images of the respective three distance image sensors 6 onto the space model MD, the flat surface area R1 and the curved surface area R2 and further re-projecting them onto a processing target distance image plane R3. Additionally, the image-creating device 100 creates the output distance image by applying an image conversion process (for example, a scale conversion process, an affine conversion process, a distortion conversion process, a view point conversion process, etc.) to the created processing target distance image. Then, the image-creating device 100 simultaneously displays a distance image of the vicinity of the shovel 60 viewed from above (a distance image in the flat surface area R1) and an image viewed from the shovel 60 in a horizontal direction (a distance image in the processing target distance image plane R3). The image displayed in the center of the output distance image is a CG image 60CG of the shovel 60.

The input distance images and the output distance image illustrated in FIGS. 15A through 15D are displayed so that they are whiter (paler) as a pixel value (a distance from the distance image sensor 6) is smaller and darker (deeper) as a pixel value is larger. Pixel values (distances) of portions corresponding to a road surface and the upper-part turning body 63 are set to a maximum value (an infinite distance) so as to improve visibility of an object existing in the vicinity of the shovel 60 in the output distance image. That is, the portions corresponding to a road surface and the upper-part turning body 63 are expressed in black.

In FIGS. 15A through 15D, each of the input distance image of the right side distance image sensor 6R and the input distance image of the back side distance image sensor 6B captures a person within an overlapping area of the imaging range of the right side distance image sensor 6R and the back side distance image sensor 6B (refer to an area R15 encircled by a double-dashed chain line in the input distance image of the right side distance image sensor 6B and an area R16 encircled by a double-dashed chain line in the input distance image of the back side distance image sensor 6B).

However, if the coordinates on the output distance image plane are associated with the coordinates on the input distance image plane with respect to the distance image sensor located at the nearest position, the output distance image causes the person in the overlapping area to disappear (refer to an area R17 encircled by a single-dashed chain line in the output distance image).

Thus, the image-creating device 100 associates the coordinates having the smaller pixel value (distance) of the back side distance image sensor 6B on the input distance image plane or the right side distance image sensor 6R on the input distance image plane, with the coordinates on the output distance image plane. As a result, the image-creating device 100 causes the two distance images regarding one solid object to be displayed on the output distance image to prevent the solid object from disappearing in the output distance image. Hereinafter, the process of preventing the object from disappearing in the overlapping area of the imaging ranges of the respective two distance image sensors is referred to as a distance image disappear preventing process.

Figure 15C:
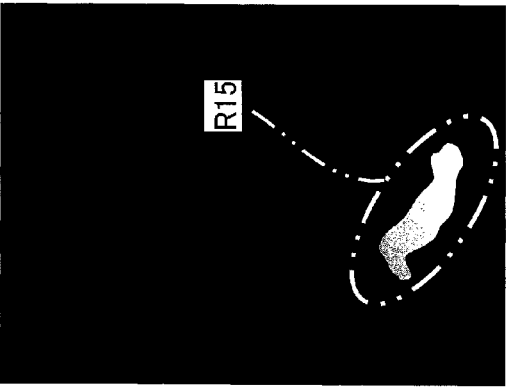
FIG. 15C is a photographic illustration of an input distance image taken by a right side distance image sensor.
Figure 15A:
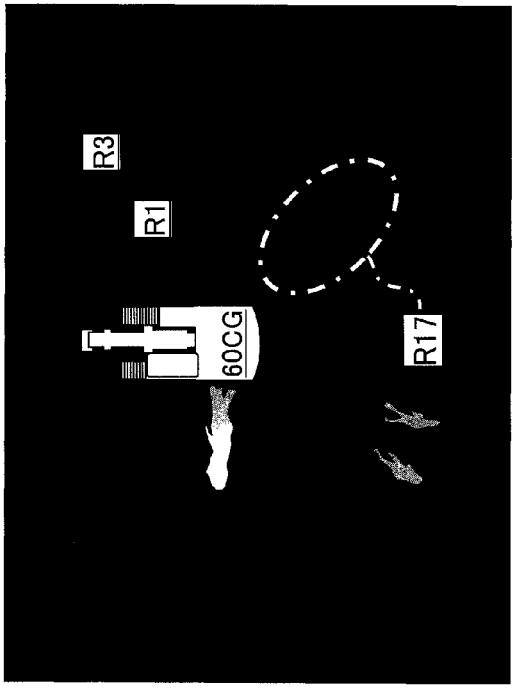
FIG. 15A is a photographic illustration of an output distance image.
Figure 15B:
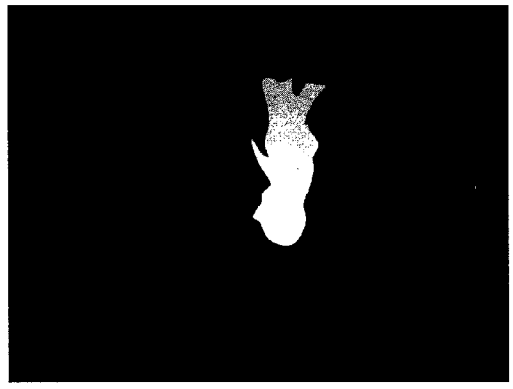
FIG. 15B is a photographic illustration of an input distance image taken by a left side distance image sensor.
Figure 15D:
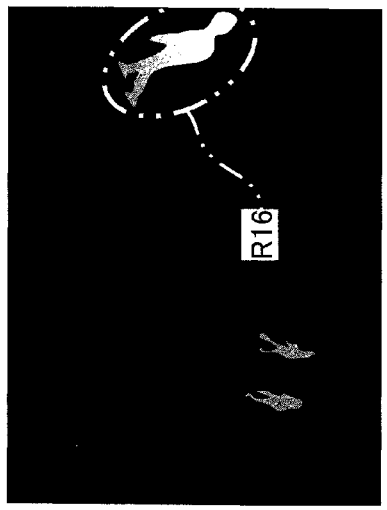
FIG. 15D is a photographic illustration of an input distance image taken by a back side distance image sensor.
Figure 16A:
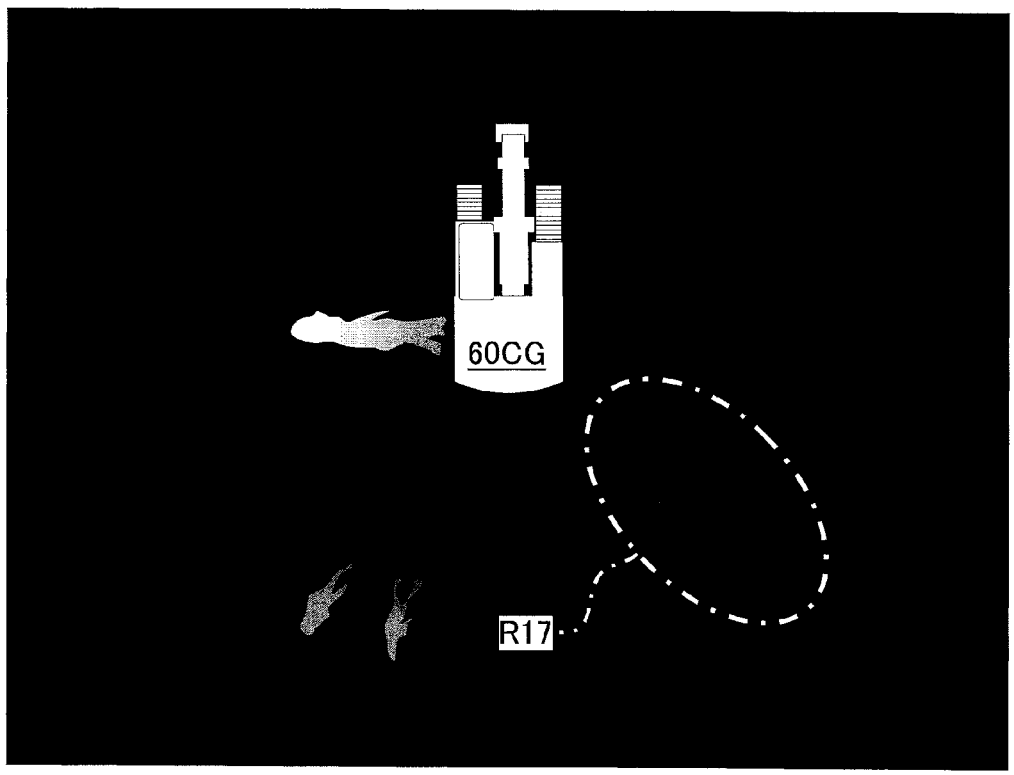
FIG. 16A is an enlarged photographic illustration of the output distance image illustrated in FIG. 15A.
Figure 16B:
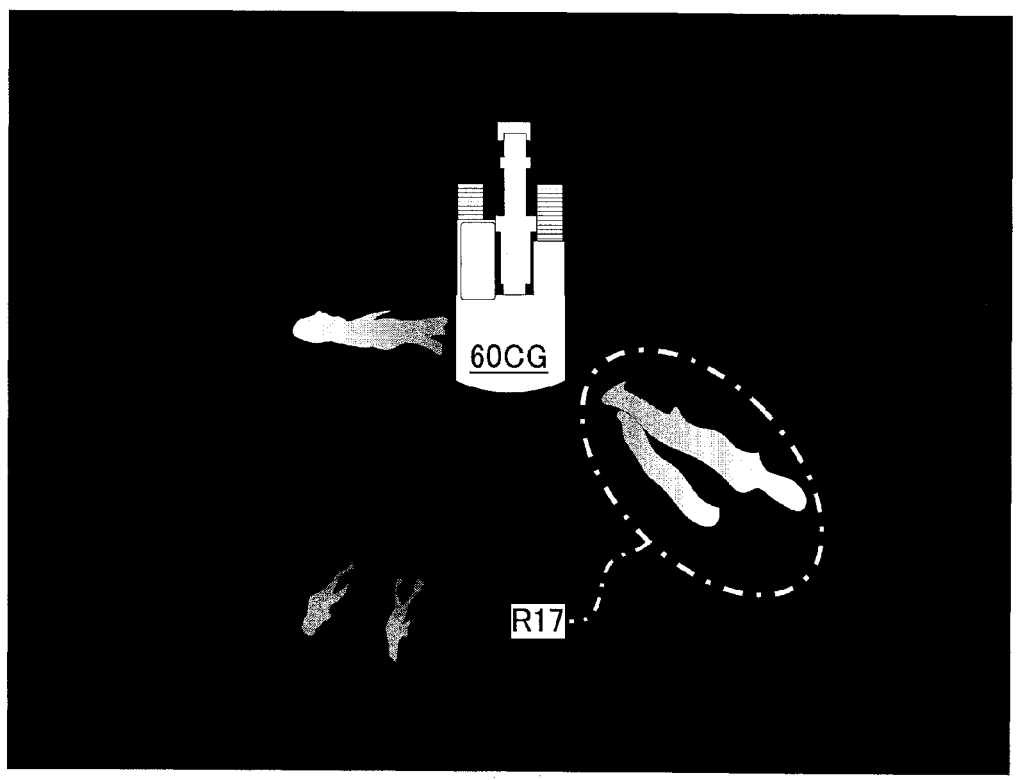
FIG. 16B is a photographic illustration of an output distance image obtained by applying an image disappearance preventing process to the output distance image of FIG. 16A.

FIG. 16A is an enlarged photographic illustration of FIG. 15A. FIG. 16B is a photographic illustration of an output distance image obtained by applying the distance image disappear preventing process to the output distance image of FIG. 16A. A person does not appear in an area R17 encircled by a single-dashed chain line in the upper illustration of FIG. 16A, while the person is displayed without disappearing in an area R17 encircled by a single-dashed chain line in FIG. 16B.

Next, a description is given, with respect to FIG. 17 and FIG. 18, of a process of the image-creating device 100 to synthesize the output image with the output distance image (hereinafter, referred to as "distance image synthesizing process").

Figure 17:
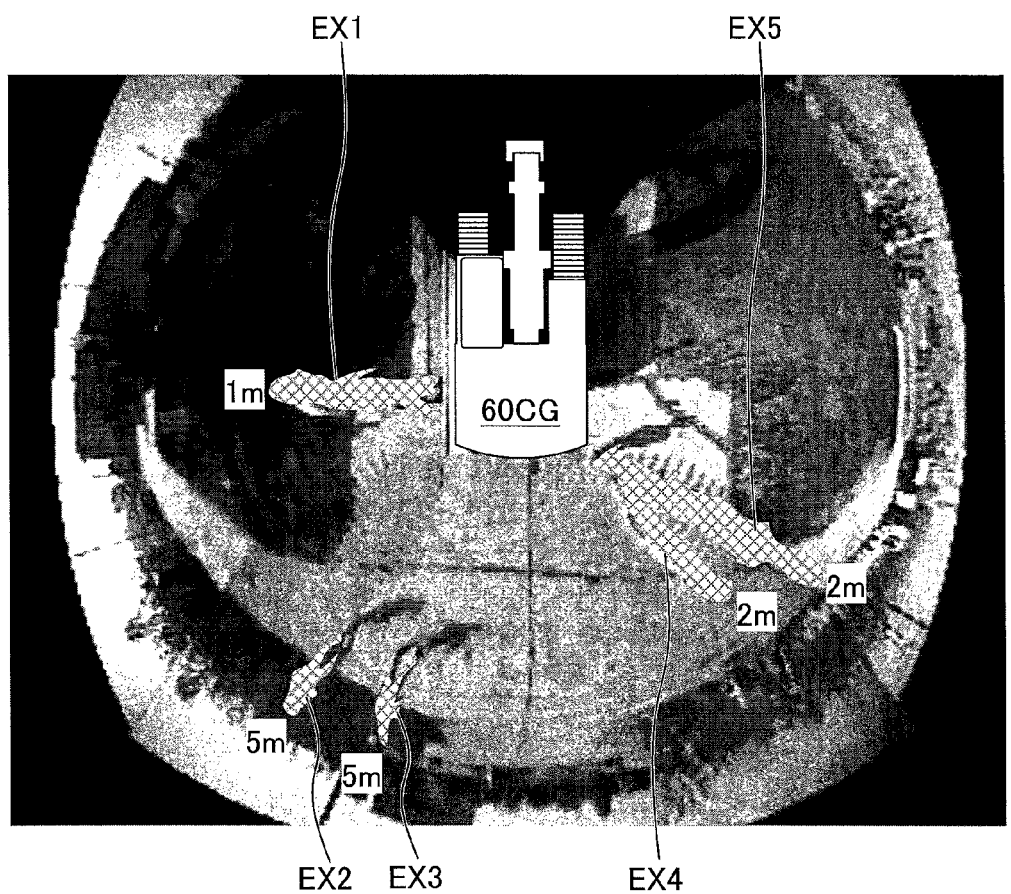
FIG. 17 is a photographic illustration illustrating an example of a composite output image obtained by synthesizing an output image with an output distance image.

FIG. 17 is a photographic illustration illustrating an example of a synthesized output image acquired by synthesizing the output image with the output distance image.

The distance image synthesizing part 12 of the image-creating device 100 extracts pixels having a pixel value (distance) smaller than a predetermined value in the output distance image illustrated in FIG. 16B. Then, the distance image synthesizing part 12 converts the pixel values (distance information) of the extracted pixels into brightness values, hue values, chroma values, etc. Thereupon, the distance image synthesizing part 12 causes the output image illustrated in FIG. 14B to display the extracted pixels in an overlapping manner. Each extracted pixel displayed in an overlapping manner has, for example, a color corresponding to a distance from the distance image sensor 6, and the color is changed stepwisely, such as red, yellow, green and blue, or steplessly as the distance increases. Each extracted pixel displayed in an overlapping manner may have a brightness corresponding to the distance from the distance image sensor 6, and the brightness may be decreased stepwisely or steplessly as the distance increases. Areas EX1 through EX5 of FIG. 17 are areas formed by the extracted pixels, and, hereinafter, referred to as object areas.

The distance image synthesizing part 12 may cause distance information of the object areas EX1 through EX5, which are formed by adjacent extracted pixels of more than or equal to a predetermined number, to be displayed on the output image in an overlapping manner. Specifically, the distance image synthesizing part 12 causes, for example, a minimum value, a maximum value, a mean value, a median value, etc., of the pixel values (distances) of the pixels forming the object area EX1 to be displayed on the output image in an overlapping manner as a representative value representing a distance to the object area EX1. The distance image synthesizing part 12 may display the representative value on the output image in an overlapping manner only in a case where the representative value is smaller than a predetermined value. This is to make an object comparatively close to the shovel 60, that is, a possibility of contact is comparatively high, to be recognizable more easily.

Figure 18:
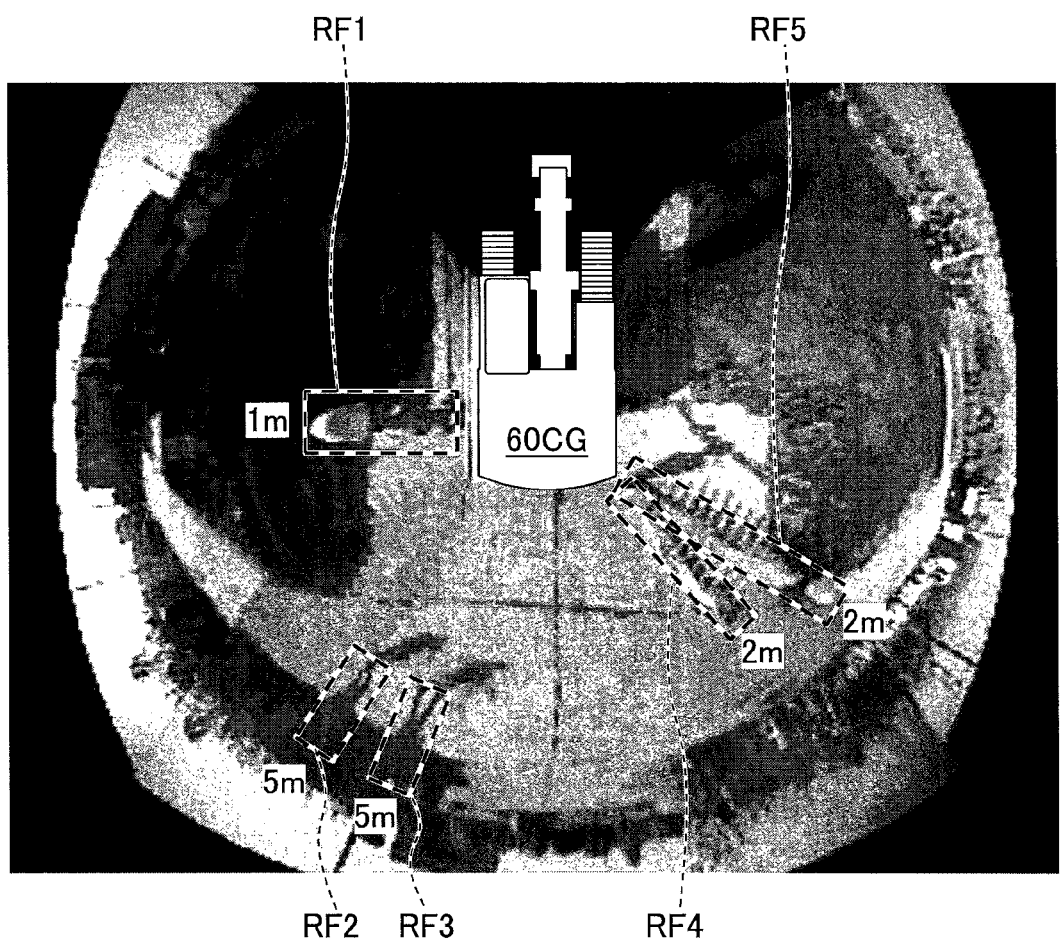
FIG. 18 is a photographic illustration illustrating another example of a composite output image obtained by synthesizing an output image with an output distance image.

FIG. 18 is an illustration of another example of the synthesized output image acquired by synthesizing the output image with the output distance image.

As illustrated in FIG. 18, the distance image synthesizing part 12 displays frames RF1 through RF5 corresponding to the object areas EX1 through EX5 of FIG. 17, respectively, in an overlapping manner instead of displaying the extracted pixels after changing the color or brightness thereof in an overlapping manner. A kind of line of the frame can be an arbitrary line including a dotted line, a solid line, a dashed line, a single-dashed chain line, etc., and a shape of the frame can also be an arbitrary shape including a square shape, a circular shape, an oval shape and a polygonal shape.

Additionally, the distance image synthesizing part 12 may cause the distance information corresponding to the respective frames RF1 through RF5 to be displayed on the output image in an overlapping manner. Specifically, the distance image synthesizing part 12 causes, for example, a minimum value, a maximum value, a mean value, a median value, etc., of the pixel values (distances) of the pixels forming the object area EX1 corresponding to the frame RF1 to be displayed on the output image in an overlapping manner as a representative value of distances corresponding to the frame RF1. The distance image synthesizing part 12 may display the representative value on the output image in an overlapping manner only in a case where the representative value is smaller than a predetermined value. This is to make an object comparatively close to the shovel 60, that is, a possibility of contact is comparatively high, to be recognizable more easily.

The distance image synthesizing part 12 may change the color of the frame in response to the corresponding distance information. Specifically, the distance image synthesizing part 12 changes the color of the frame stepwisely, such as red, yellow, green and blue, or steplessly as the distance is increased. The distance image synthesizing part 12 may decrease the brightness of the frame stepwisely or steplessly as the distance increases.

By viewing the above-mentioned synthesized output image, the operator of the shovel 60 can more easily recognize a position of an object existing in the periphery of the shovel 60 and a distance to the object. Additionally, the operator of the shovel 60 can more easily recognize a position of an object existing in a blind area for the operator's view and a distance to the object.

According to the above-mentioned structure, the image-creating device 100 synthesizes the output image created based on the input image taken by the camera 2 with the output distance image created based on the input distance image taken by the distance image sensor 6. Thereby, the image-creating device 100 can measure a distance to each object existing in a comparatively wide range in the vicinity of the shovel 60. As a result, the image-creating device 100 can create a synthesize output image having high reliability.

Moreover, the camera 2 and the distance image sensor 6 are arranged so that the respective imaging ranges surround the vicinity of the shovel 60. Thus, the image-creating device 100 can create the synthesized output image representing an appearance of the periphery of the shovel 60 when viewing from above. As a result, the operator of the shovel 60 can more easily recognize a position of an object existing in the periphery of the shovel 60 and a distance to that object.

Moreover, the image-creating device 100 applies an image conversion process, which is the same as the image conversion process applied to the processing target image, to the processing target distance image. Thus, the image-creating device 100 can easily associate the coordinates on the output image plane with the coordinates on the output distance image plane.

Furthermore, the image-creating device 100 changes the color of extracted pixels or the frame stepwisely or steplessly in response to a distance from the distance image sensor 6, that is, a distance from the shovel 60. Thus, the operator of the shovel 60 can sensibly judge the presence of a risk of contact.

Figure 19:
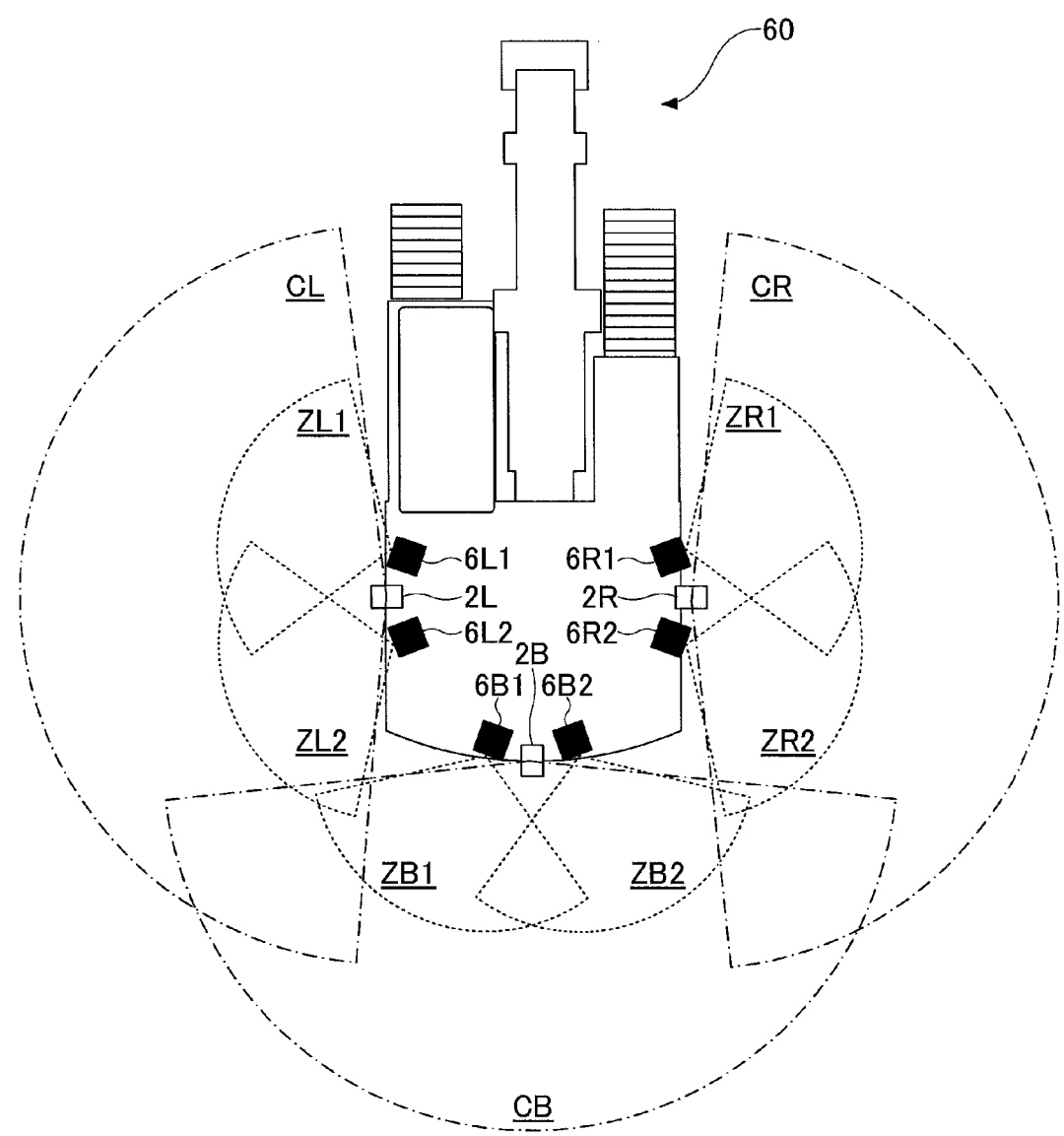
FIG. 19 is a plan view of a shovel equipped with an image-creating device having three cameras and six distance image sensors.

Next, a description is given, with reference to FIG. 19, of another arrangement of the distance image sensor 6. FIG. 19 is a plan view of the shovel 60, which corresponds to FIG. 11.

In the embodiment illustrated in FIG. 19, the shovel 60 is equipped with three cameras 2 (a left side camera 2L, a right side camera 2R and a back side camera 2B) and six distance image sensors 6 (a first left side distance image sensor 6L1, a second left side distance image sensor 6L2, a first right side distance image sensor 6R1, a second right side distance image sensor 6R2, a first back side distance image sensor 6B1 and a second back side distance image sensor 6B2). Areas CL, CR, CB indicated by single-dashed chain lines in FIG. 19 illustrate imaging ranges of the left side camera 2L, the right side camera 2R and the back side camera 2B, respectively. Areas ZL1, ZL2, ZR1, ZR2, ZB1 and ZB2 indicated by dotted lines in FIG. 19 indicate imaging ranges of the first left side distance image sensor 6L1, the second left side distance image sensor 6L2, the first right side distance image sensor 6R1, the second right side distance image sensor 6R2, the first back side distance image sensor 6B1 and the second back side distance image sensor 6B2, respectively.

As illustrated in FIG. 19, blind spots of the distance image sensors 6L1, 6L2, 6R1, 6R2, 6B1 and 6B2 are narrower than the distance image sensors illustrated in FIG. 11. Thus, the imaging range of one of the distance image sensors may not cover the imaging range of the corresponding camera.

Thus, in the configuration illustrated in FIG. 19, the distance image sensor is attached on each side of one of the cameras so that the imaging range of the corresponding one of the cameras can be covered by the imaging ranges of the two distance image sensors. It should be noted that three or more distance image sensors may be attached in the periphery of the corresponding one of the cameras.

According to the arrangement of the distance image sensors 6, even when an angle of view of the distance image sensor 6 is narrower than an angle view of the camera 2, the image-creating device 100 can create a synthesized output distance image the same as the case where the configuration illustrated in FIG. 11 is used, that is, a case where an angle of view of a distance image sensor is substantially equal to an angle of view of a camera. It should be noted that the arrangement of the distance image sensor 6 does not negatively affect the mountability and appearance.

Although the preferred embodiments have been explained in detail, the present invention is not limited to the above-mentioned embodiments and various variations and replacements may be applied to the above-mentioned embodiments without departing from the scope of the present invention.

For example, although the image-creating device 100 uses the cylindrical space model MD as a space model in the above-mentioned embodiments, a space model having other columnar shapes such as a polygonal column may be used. Additionally, a space model configured by two surfaces, which are a bottom surface and a side surface, may be used. Alternatively, a space model having only a side surface may be used.

Moreover, the image-creating device 100 is mounted together with a camera and a distance image sensor on a shovel, which moves while being equipped with movable members such as a bucket, an arm, a boom, a turning mechanism, etc. Then, the image-creating device 100 constructs an operation assist system, which assists a travel of the shovel and an operation of those movable members while presenting a peripheral image to the operator. However, the image-creating device 100 may be mounted together with a camera and an image distance sensor to a working machine, such as a folk lift, an asphalt finisher, etc., which does not have a turning mechanism. Alternatively, the image-creating device 100 may be mounted together with a camera and a distance image sensor to a working machine, such as an industrial machine, stationary crane, etc., which has a movable member but does not self-travel. Then, the image-creating device 100 may construct an operation assist system which assists an operation of those working machines.

Moreover, in the above-mentioned embodiments, the distance image synthesizing part 12 creates the output distance image and, thereafter, synthesizes the output image with the created output distance image. However, the present invention is not limited to such a process of creating the synthesized output image. For example, the distance image synthesizing part 12 may create a synthesized input image by synthesizing the input image and the input distance image and create a synthesized processing-target image in which information regarding a distance image is displayed in an overlapping manner, and, thereafter, may create the synthesized output image. Additionally, the distance image synthesizing part 12 may create a synthesized output image, for example, after creating a synthesized processing-target image by synthesizing a processing-target image with a processing target distance image.

The above-mentioned embodiments can provide a periphery-monitoring device which can convey the existence or situation of a peripheral object to an operator more intelligibly.

What is claimed is:

1. A periphery-monitoring device for a working machine, comprising:
   a camera to be mounted to the working machine to acquire an image of an object in a periphery of the working machine as an input image in an input image plane;
   a distance image sensor to be attached to the working machine to acquire distance information of the object as an input distance image in an input distance image plane, the distance image sensor including a first distance image sensor and a second distance image sensor that are configured to acquire the distance information of the object as a first input distance image and a second input distance image, respectively, wherein there is an overlap of an imaging range between the first and second distance image sensors; and
   a computer programmed to execute a process, the process including
      converting the input image into an output image in an output image plane based on correspondence between coordinates of the input image plane and coordinates of the output image plane;
      creating an output distance image based on the first input distance image and the second input distance image by converting the first input distance image and the second input distance image into the output distance image in an output distance image plane based on correspondence between coordinates of the input distance image plane and coordinates of the output distance image plane, wherein a pixel of the output distance image in an area corresponding to the overlap of the imaging range is associated with a smaller one of a pixel value of a first pixel of the first input distance image and a pixel value of a second pixel of the second input distance image, the first pixel and the second pixel corresponding to said pixel of the output distance image; and
      displaying the output image and the output distance image in an overlapping manner.

2. The periphery-monitoring device as claimed in claim 1, wherein the output distance image is a distance image to which a view point conversion process is applied.

3. The periphery-monitoring device as claimed in claim 1, wherein
   the camera includes a plurality of cameras configured to acquire the image of the object, the plurality of cameras including a first camera and a second camera that are configured to acquire the image of the object as a first input image and a second input image, respectively,
   the input image plane includes a first input image plane in which the first input image is positioned and a second input image plane in which the second input image is positioned,
   there is an overlap of an imaging range between the first and second cameras, and
   an area of the output image corresponding to the overlap of the imaging range includes a first area associated with coordinates of the first input image plane and a second area associated with coordinates of the second input image plane.

4. The periphery-monitoring device as claimed in claim 1, wherein a mode of displaying the output distance image is changed in accordance with a distance from the distance image sensor to the object.

5. The periphery-monitoring device as claimed in claim 1, wherein
   the process further includes
      extracting a pixel of the output distance image, the pixel having a pixel value smaller than a predetermined value; and
      synthesizing the output image and the extracted pixel of the output distance image into a synthesized output image, and
   said displaying displays the synthesized output image.

6. The periphery-monitoring device as claimed in claim 5, wherein a mode of displaying a portion of the synthesized output image corresponding to the extracted pixel of the output distance image is changed in accordance with a distance from the distance image sensor to the object.

7. The periphery-monitoring device as claimed in claim 5, wherein
   the process further includes converting the pixel value of the extracted pixel of the output distance image from the distance information to at least one of a brightness value, a hue value, and a chroma value, and
   the extracted pixel having the converted value is synthesized with the output image.

* * * * *